US012200308B2

(12) United States Patent
Sinha

(10) Patent No.: US 12,200,308 B2
(45) Date of Patent: Jan. 14, 2025

(54) METHODS AND APPARATUS FOR COMMUNICATING AND DISPLAYING SHORT MESSAGE SERVICE (SMS) MESSAGES

(71) Applicant: Charter Communications Operating, LLC, St. Louis, MO (US)

(72) Inventor: Ashutosh Kumar Sinha, Centennial, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 248 days.

(21) Appl. No.: 17/881,230

(22) Filed: Aug. 4, 2022

(65) Prior Publication Data

US 2024/0048814 A1 Feb. 8, 2024

(51) Int. Cl.
H04N 21/4788 (2011.01)
H04N 21/643 (2011.01)
H04W 4/14 (2009.01)

(52) U.S. Cl.
CPC ... *H04N 21/4788* (2013.01); *H04N 21/64322* (2013.01); *H04W 4/14* (2013.01)

(58) Field of Classification Search
CPC ........ H04N 21/4788; H04N 21/64322; H04W 4/14
See application file for complete search history.

(56) References Cited

U.S. PATENT DOCUMENTS 9,407,451 B1* 8/2016 Mistry ............... H04N 1/00106

OTHER PUBLICATIONS

Robert Triggs, What is SMS messaging and how does it work?, Android Authority, Aug. 27, 2021, downloaded from https://www.androidauthority.com/what-is-sms-280988/ on Jul. 12, 2022, 11 pages.
ETSI TS 124 304, V9.0.0; Digital cellular telecommunications system (Phase 2+); Universal Mobile Telecommunications System (UMTS); LTE; Mobility management based on Mobile IPV4; User equipment (UE)—foreign agent interface; Stage 3 (3GPP TS 324.304 version 9.0.0Release 9) Jan. 2010, 14 pages.
3GPP TS 24.304 V17.0.0; 3rd Generation Partnership Project; Technical Specification Group Core Network and Terminals; Mobility management based on Mobile IPV4; User Equipment (UE)—Foreign Agent interface; Stage 3 (Release 17), Mar. 2022, 12 pages.

* cited by examiner

*Primary Examiner* — Curtis B Odom
(74) *Attorney, Agent, or Firm* — Straub & Straub; Michael P. Straub; Stephen T. Straub

(57) ABSTRACT

A SMS message is conditionally additionally directed toward an STB, located at the customer premises, to which the target phone number of the SMS message corresponds, and is displayed on a device, e.g., a TV, coupled to the STB, in addition to being directed to the phone corresponding to the target phone number. A new STB SMS server: i) determines whether an incoming SIP message including a SMS message is to be sent toward a STB for SMS display on a display device coupled to the STB, or is to be dropped, e.g., based on a SMS_DISPLAY_STB flag value in a subscriber profile corresponding to the target phone number, ii) determines, for a SIP message including a SMS message, a particular video endpoint, and iii) sends a SIP message including a SMS message to a determined video endpoint for SMS message delivery to a STB interfacing with the video endpoint.

20 Claims, 19 Drawing Sheets

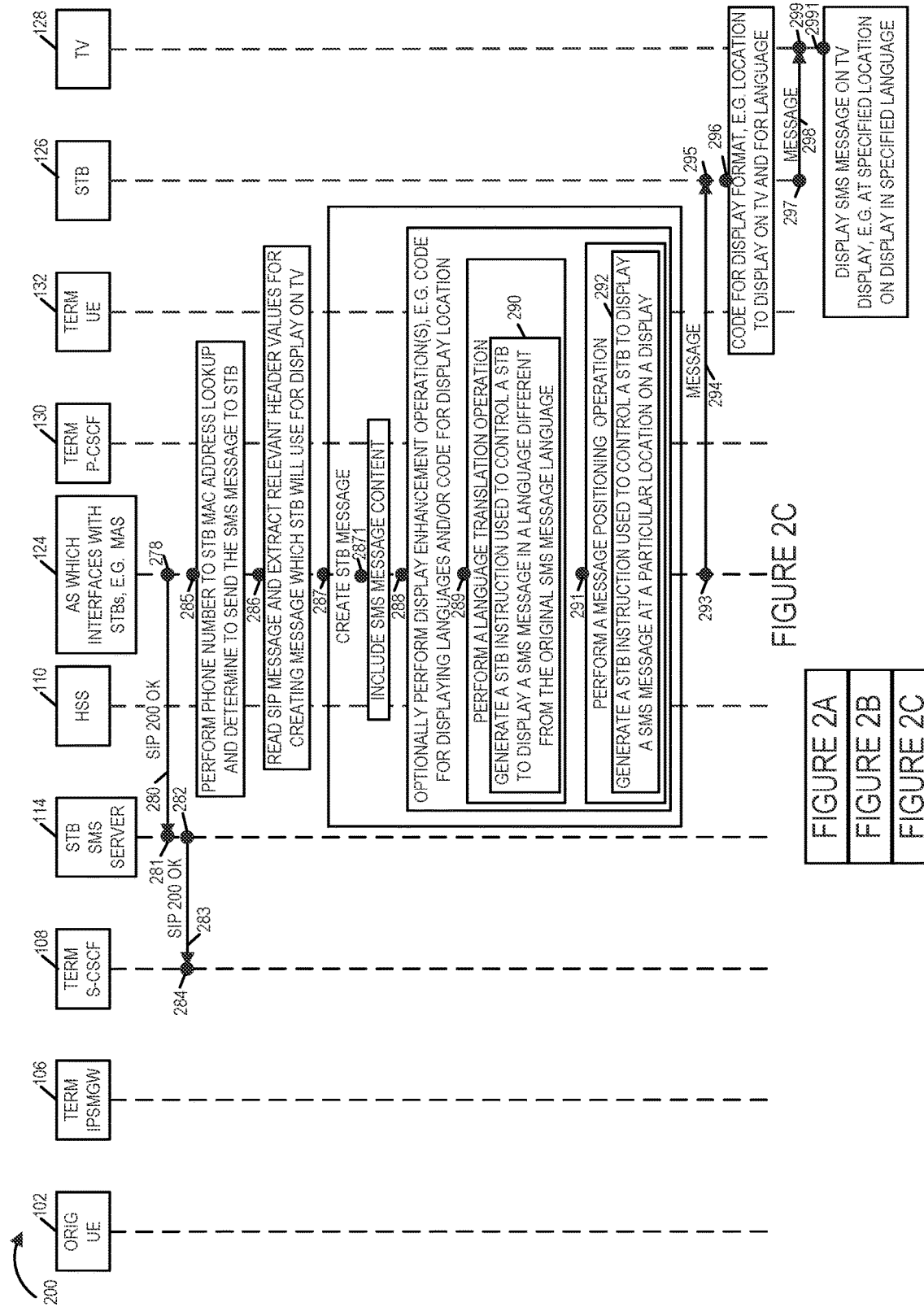

INITIAL FILTERING CRITERIA ROUTINE

```
<InitialFilterCriteria>
  <Priority>1</Priority>
  <TriggerPoint>
    <ConditionTypeCNF>1</ConditionTypeCNF>
    <SPT>
      <Group>0</Group>
      <Method>MESSAGE</Method>
    </SPT>
    <SPT>
      <Group>1</Group>
      <SIPHeader>
        <Header>Content-Type</Header>
        <Content>application/vnd.3gpp.sms</Content>
      </SIPHeader>
    </SPT>
    <SPT>
      <Group>2</Group>
      <SessionCase>TERMINATING_REGISTERED</SessionCase>
    </SPT>
  </TriggerPoint>
  <ApplicationServer>
    <ServerName>sip:SMS_Display_STB.example.com:5060;transport=tcp</ServerName>
    <DefaultHandling>0</DefaultHandling>
  </ApplicationServer>
</InitialFilterCriteria>
```

FIGURE 3

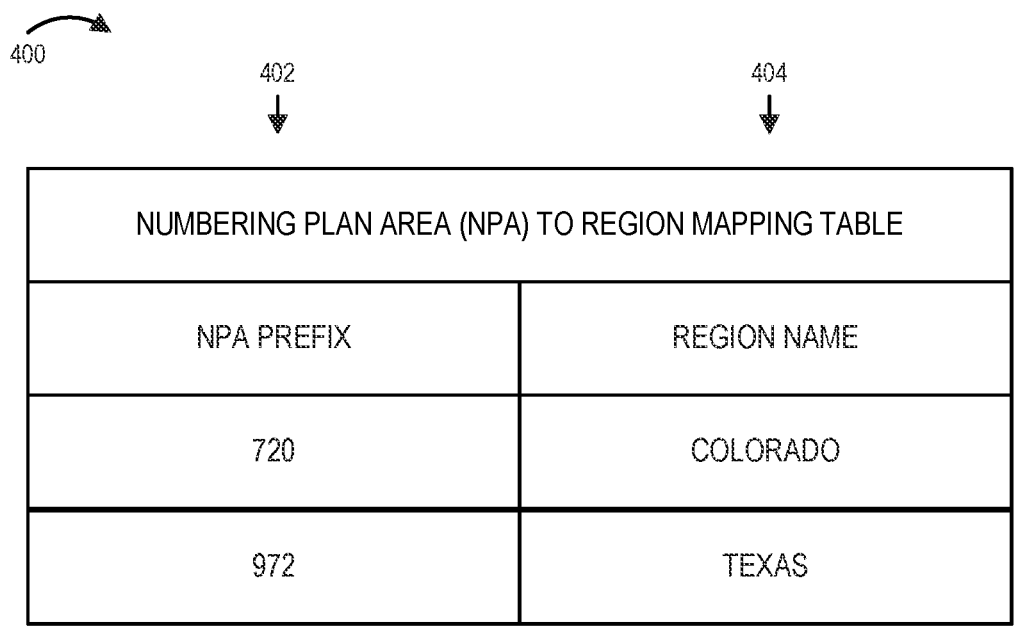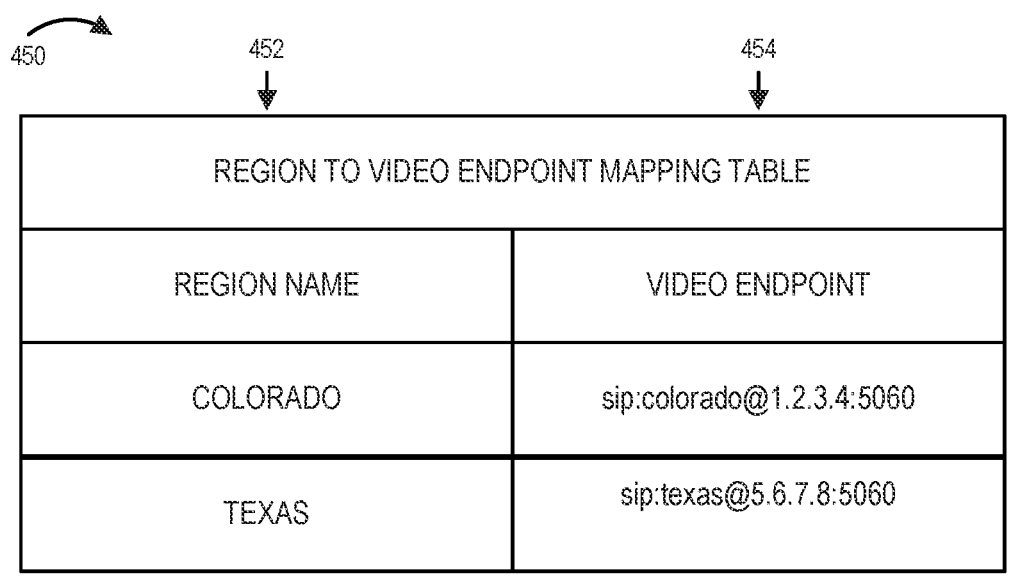
FIGURE 4

500 → 502 ↓ 504 ↓

| VIDEO ENDPOINT (sip:colorado@1.2.3.4:5060) PHONE NUMBER TO MAC ADDRESS MAPPING DATABASE ||
|---|---|
| PHONE NUMBER | MAC ADDRESS |
| FIRST PHONE NUMBER (e.g., UE 2 PHONE NUMBER) | MAC ADDRESS FOR 1ST STB/TV (E.G., MAC ADDRESS FOR STB1/TV1) |
| SECOND PHONE NUMBER (e.g., UE 3 PHONE NUMBER) | MAC ADDRESS FOR 1ST STB/TV (E.G., MAC ADDRESS FOR STB1/TV1) |
| THIRD PHONE NUMBER (e.g., UE 4 PHONE NUMBER) | MAC ADDRESS FOR 1ST STB/TV (E.G., MAC ADDRESS FOR STB1/TV1) |
| FOURTH PHONE NUMBER (e.g., UE 5 PHONE NUMBER) | MAC ADDRESS FOR 2ND STB/TV (E.G., MAC ADDRESS FOR STBn/TV2) |
| FIFTH PHONE NUMBER (e.g., UE 6 PHONE NUMBER) | MAC ADDRESS FOR 2ND STB/TV (E.G., MAC ADDRESS FOR STBn/TV2) |

550 → 552 ↓ 554 ↓

| VIDEO ENDPOINT (sip:texas@5.6.7.8:5060) PHONE NUMBER TO MAC ADDRESS MAPPING DATABASE ||
|---|---|
| PHONE NUMBER | MAC ADDRESS |
| SIXTH PHONE NUMBER (e.g., UE 7 PHONE NUMBER) | MAC ADDRESS (E.G., MAC ADDRESS FOR STB1A/TV3) |
| SEVENTH PHONE NUMBER (e.g., UE 8 PHONE NUMBER) | MAC ADDRESS FOR 3RD STB/TV (E.G., MAC ADDRESS FOR STB1A/TV3) |
| EIGHTH PHONE NUMBER (e.g., UE 9 PHONE NUMBER) | MAC ADDRESS FOR 3RD STB/TV (E.G., MAC ADDRESS FOR STBnA/TV4) |
| NINTH PHONE NUMBER (e.g., UE 10 PHONE NUMBER) | MAC ADDRESS FOR 4TH STB/TV (E.G., MAC ADDRESS FOR STBnA/TV4) |

FIGURE 5

METHODS AND APPARATUS FOR COMMUNICATING AND DISPLAYING SHORT MESSAGE SERVICE (SMS) MESSAGES

FIELD

The present application relates to communications, and more particularly, to methods and apparatus for communicating and displaying Short Message Service (SMS) messages.

BACKGROUND

Currently SMS message display is not available on set top box (STB)/TV. For customers having both Cable TV and wireline phone service from a service provider, the service provider may, and sometimes does, currently provide a Caller ID service which displays the incoming calls on their TVs thru set top boxes. It would improve the customer experience and be beneficial, if a service provider also provided SMS message display on their TV thru set top boxes. If such a new SMS message STB/TV display service was available, a customer watching a TV at the customer premises would be able to quickly and conveniently view an incoming SMS message directed to a phone number, associated with the customer premises, without having to move to the phone's location or operate the phone to which the SMS message is directed to recover the SMS message. Based on the above discussion, there is a need for new methods and apparatus for supporting the communication of SMS messages to STBs and the display of SMS messages on display devices, e.g. TVs coupled to the STBs.

SUMMARY

Methods and apparatus for communicating and displaying SMS messages are described. A SMS message is typically sent to the phone, having the target (destination) phone number of the SMS message. In some embodiments, in accordance with the present invention, an SMS message is conditionally additionally directed toward an STB, located at a customer premises, to which the target phone number corresponds, and is controlled to be displayed on a device, e.g. a TV, coupled to the STB, in addition to being directed to the phone corresponding to the target phone number.

In various embodiments, a new application server, e.g. a SMS STB server, is implemented and included in the communications system to perform one or more of: i) determining whether an incoming SIP message including a SMS message is to be sent toward a STB for SMS display on a display device, e.g., TV, coupled to the STB, or is to be dropped, e.g., based on the value of a novel flag, e.g. the value of a "SMS_DISPLAY_FLAG" in a subscriber profile (e.g. included in HSS) corresponding to the target phone number, ii) determining, for a SIP message including a SMS message which is to be sent toward an STB, a particular video endpoint, e.g., a particular application server which interfaces with STBs, to which a SIP message including the SMS message is to be sent, e.g., based on the Numbering Plan Area (NPA) prefix of the target phone number and stored mapping information, and iii) sending a SIP message including a SMS message to a determined video endpoint for SMS delivery to a STB interfacing with the video endpoint. In some embodiments, the video endpoint device determines a MAC address corresponding to the STB/TV to which the SMS message is to be sent and sends the SMS message content and optionally additional control information, e.g., language and/or display positioning information to the STB. The STB receives the SMS message content and control information, and sends SMS message content and control signals to the TV, which display the SMS message in accordance with the control information.

An exemplary communications method, in accordance with some embodiments, comprises, receiving at a Short Message Service (SMS) server, a Session Initiation Protocol (SIP) message including a target phone number and SMS content; retrieving user profile information corresponding to the target phone number, said user profile information including set top box (STB) SMS display setting information; determining from the retrieved user profile information if STB display of SMS messages is enabled for a STB associated with the target phone number; and taking an action based on said determination, said action including: i) continuing operation without communicating the SIP message to another device for STB message delivery or ii) sending the SIP message to another device for STB message delivery in response to determining that the retrieved user profile information indicates that STB display of SMS messages is enabled.

A communications system, in accordance with some embodiments, comprises: a Short Message Service (SMS) server including: a first receiver; a first transmitter; and a first processor configured to: operate the SMS server to receive a Session Initiation Protocol (SIP) message including a target phone number and SMS content; operate the SMS server to retrieve user profile information corresponding to the target phone number, said user profile information including set top box (STB) SMS display setting information; determine from the retrieved user profile information if STB display of SMS messages is enabled for a STB associated with the target phone number; and operate the SMS server to take an action based on said determination, said action including: i) continuing operation without communicating the SIP message to another device for STB message delivery or ii) sending the SIP message to another device for STB message delivery in response to determining that the retrieved user profile information indicates that STB display of SMS messages is enabled.

Numerous variations on the described methods and apparatus are possible and while several embodiments are described in detail it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 2C is a third part of a signaling diagram illustrating an exemplary communications method including the conditional delivery of SMS message content to a TV via a set top box (STB), in addition to regular delivery of the SMS message content to a user equipment (UE), in accordance with an exemplary embodiment.

FIG. 2 comprises the combination of FIG. 2A, FIG. 2B and FIG. 2C.

FIG. 3 is a drawing illustrating an exemplary initial filtering criteria (iFC) routine, which may be implemented by a device, e.g., a Serving-Call Session Control Function (S-CSCF) device, to determine whether or not a received SIP message including a SMS message should be forwarded to a Set Top Box (STB) Short Message Service (SMS) server, in accordance with an exemplary embodiment.

FIG. 4 is a drawing including an exemplary numbering plan area (NPA) to region mapping table and an exemplary region to video endpoint mapping table in accordance with an exemplary embodiment.

FIG. 5 is a drawing illustrating exemplary video endpoint phone number MAC address mapping databases, which may be used by video endpoints, e.g., application servers coupled to set top boxes, to determine, based on SMS message target phone number, a particular STB to send an SMS message for display of the SMS message on a TV at the customer premise corresponding to the target phone number.

DETAILED DESCRIPTION

Figure 1:
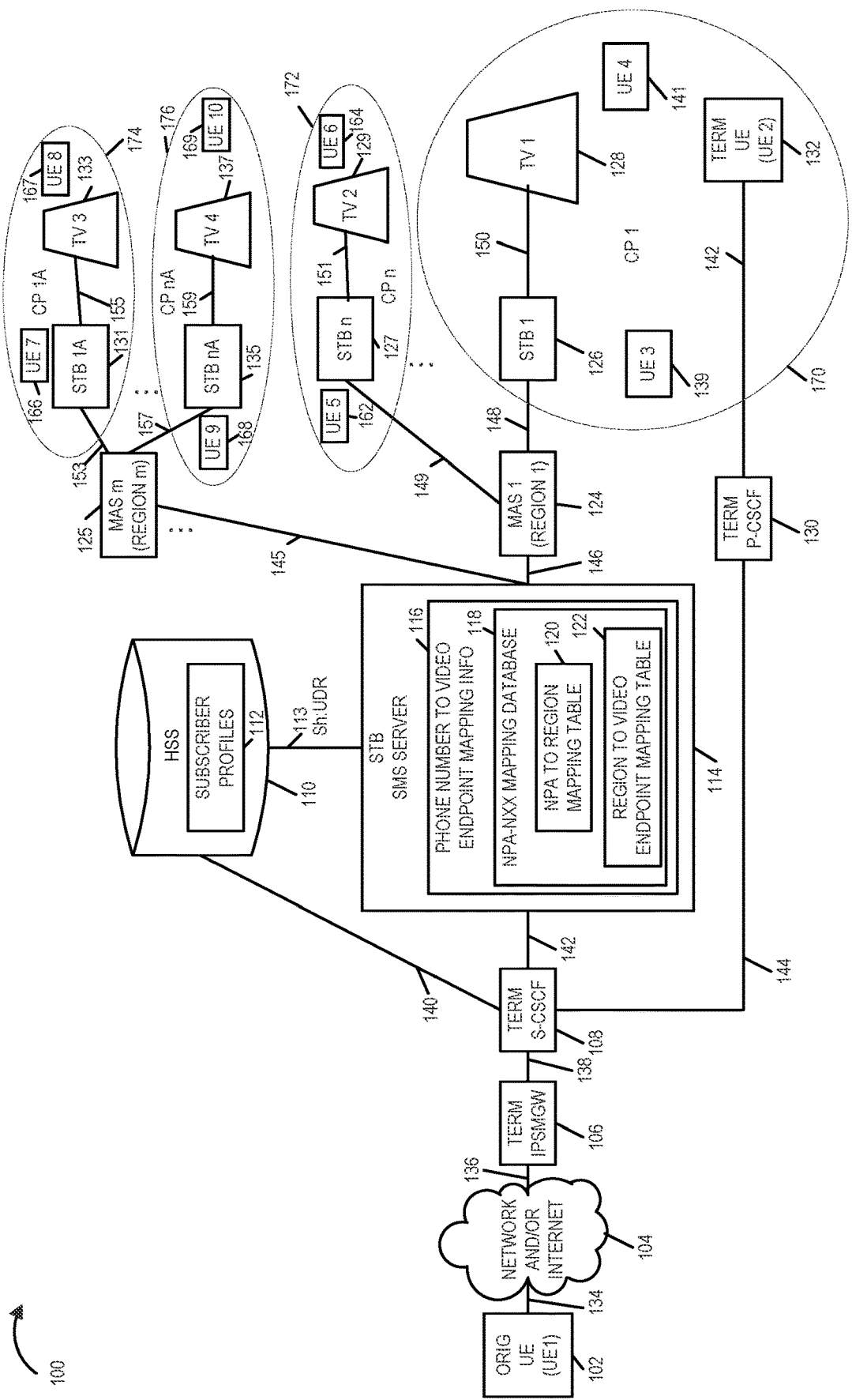
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes an originating user equipment (UE), which is UE 1 102, a network and/or Internet 104, a terminating Internet Protocol Short Message Gateway (IPSMGW) 106, a terminating Serving-Call Session Control Function (S-CSCF) 108, a Home Subscriber Server (HSS) 110, a Set Top Box (STB) Short Message Service (SMS) server 114, Mystro Application Server 1 (MAS 1) 124, STB 1 126, television 1 (TV1) 128, a terminating Proxy-Call Session Control Function (P-CSCF) 130, and a terminating UE, which is UE 2 132.

UE 1 102 is coupled to network and/or Internet 104 via communications link 134. Terminating IPSMGW 106 is coupled to network and/or Internet 104 via communications link 136. Terminating IPSMGW 106 is coupled to terminating S-CSCF 108 via communication link 138. Terminating S-CSCF 108 is coupled to HSS 110 via communications link 140. Terminating S-CSCF 108 is coupled to STB SMS server 114 via communications link 142. Terminating S-CSCF 108 is coupled to terminating P-CSCF 130 via communications link 144. STB SMS server 114 is coupled to MAS 1 124 via communications link 146. MAS 1 124, which corresponds to region 1, is coupled to STB 1 126 via communications link 148. STB 1 126 is coupled to TV1 128 via communications link 150. Terminating P-CSCF 130 is coupled to a terminating UE, which is UE 2 132.

HSS 110 includes subscriber profiles 112. The subscriber profiles include, for at least some subscribers, stored information indicating whether or not SMS message display via STB/display device (TV) is enabled for the subscriber phone number. In some embodiments, a subscriber profile includes a "SMS_DISPLAY_STB flag corresponding to a phone number of a subscriber, e.g., a SMS_DISPLAY_STB flag value=1 indicates STB display is enabled for SMS messages directed to that target phone number, and SMS_DISPLAY_STB flag value=0 indicates STB display is not enabled for SMS messages directed to that target phone number. HSS 110 is coupled to STB SMS server 114 via a Diameter based interface Sh:UDR (User Data Repository) communications link 113, via which profile queries and subscriber profile responses are communicated. STB SMS server 114 includes phone number to video endpoint mapping information 116. Phone number to video endpoint mapping information 116 includes a Numbering Plan Area (NPA)-NXX mapping database 118. NPA-NXX mapping database 118 includes a NPA to region mapping table 120 and a region to video endpoint mapping table 122.

STB 1 126 and TV1 128 are located at customer premises 1 (CP 1) 170. UE 2 132, UE 3 139 and UE 4 141 are UEs which correspond to STB 1 126, e.g., the phone numbers of UE 2 132, UE 3 139 and UE 4 141 are included as part of the subscriber profile information corresponding to STB 1 126. UE 2 132, UE 3 139 and UE 4 141 may be wireline (landline) phones, or wireless (mobile) cell phones or a combination or wireline (landline) phones and wireless (mobile) phones. Each of UE 2 132, UE 3 139 and UE 4 141 has a different phone number. In the example of FIG. 1, UE 2 132, UE 3 139 and UE 4 141 are shown as being currently located at CP 1 170; however, at different times one or more of the UEs 132, 139 and 141 may be located at a location which is outside CP1 170, if the particular UE is a mobile (e.g., cell phone) UE.

MAS 1 124 corresponds to region 1. The exemplary communications system 100 further includes one or more additional STBs which are coupled to MAS 1 124. Exemplary communications system 100 includes STB n 127 which is coupled to MAS 1 124 via communications link 149 and is coupled to TV 2 129 via communications link 151. STB n 127 and TV 2 129 are located at CP n 172. UE 5 162 and UE 6 172 are UEs which correspond to STB n 127, e.g., the phone numbers of UE 5 162, UE 3 and UE 6 172 are included as part of the subscriber profile information corresponding to STB n 127. In the example of FIG. 1, UE 5 162 and UE 6 164 are shown as being currently located at CP n 172.

Exemplary communications system 100 includes one or more additional MASs including MAS m 125, corresponding to region m, which is different than region 1. MAS M 125 is coupled to STB SMS server 114 via communications link 145. Exemplary communications system 100 further includes a plurality of STBs, including STB 1A 131 and STB nA 135 coupled to MAS m 125 via communication links (153, 157), respectively. Communications system 100 further includes TV 3 133 coupled to STB 1A 131 via communications link 155 and TV 4 137 coupled to STBnA 135 via communications link 159.

STB 1A 131 and TV3 133 are located at customer premises 1A (CP 1A) 174. UE 7 166 and UE 8 166 are UEs which correspond to STB 1A 131, e.g., the phone numbers of UE 7 166 and UE 8 167 are included as part of the subscriber profile corresponding to STB 1A 131. In the example of FIG. 1 UE 7 166 and UE 8 167 are shown as being currently located at CP 1A 174.

STB nA 135 and TV4 137 are located at customer premises nA (CP nA) 176. UE 9 168 and UE 10 169 are UEs which correspond to STB nA 135, e.g., the phone numbers of UE 9 168 and UE 10 169 are included as part of the subscriber profile corresponding to STB nA 135. In the example of FIG. 1 UE 9 168 and UE 10 169 are shown as being currently located at CP nA 176.

Exemplary communications system 100 supports the communication of SMS messages to a STB and the display of the SMS message content one a display device, e.g., TV, coupled to the STB, for subscriber phone number numbers, for which the stored subscriber profile information indicates that SMS message display via STB/display device (TV) is enabled. Thus for subscribers, which have enabled the SMS message display via STB feature, an SMS message sent to the phone number of the subscriber is additionally sent (e.g., routed based on STB SMS server mapping and Mystro Application Server mapping information) to the STB of the subscriber for display on a display device at the customer premises of the subscriber, in addition to the regular routing of the SMS message to the phone (with the target phone number) of the subscriber to which the SMS message is directed.

Figure 2A:
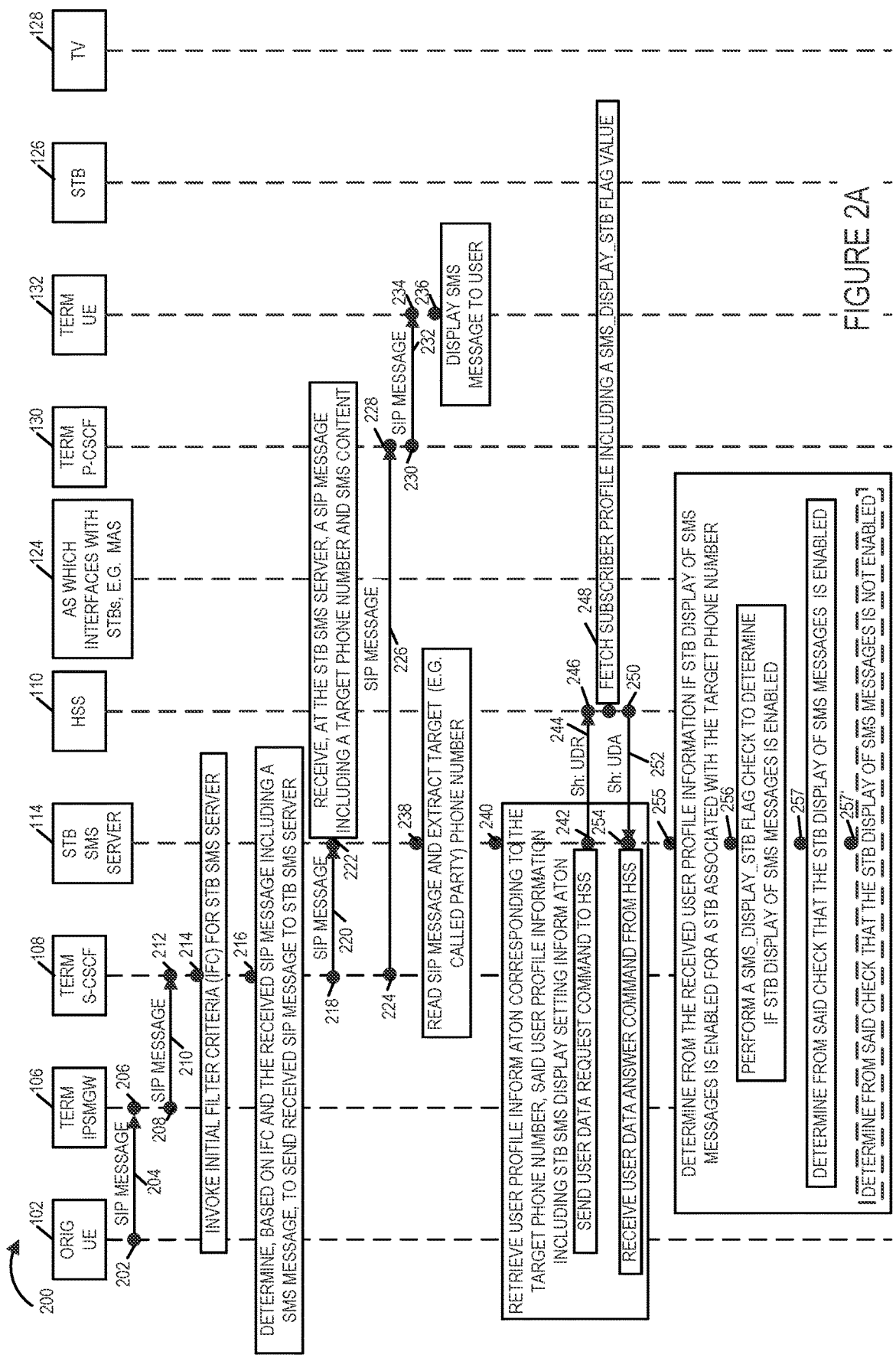
FIG. 2A is a first part of a signaling diagram illustrating an exemplary communications method including the conditional delivery of SMS message content to a television (TV) via a set top box (STB), in addition to regular delivery of the SMS message content to a user equipment (UE), in accordance with an exemplary embodiment.
Figure 2B:
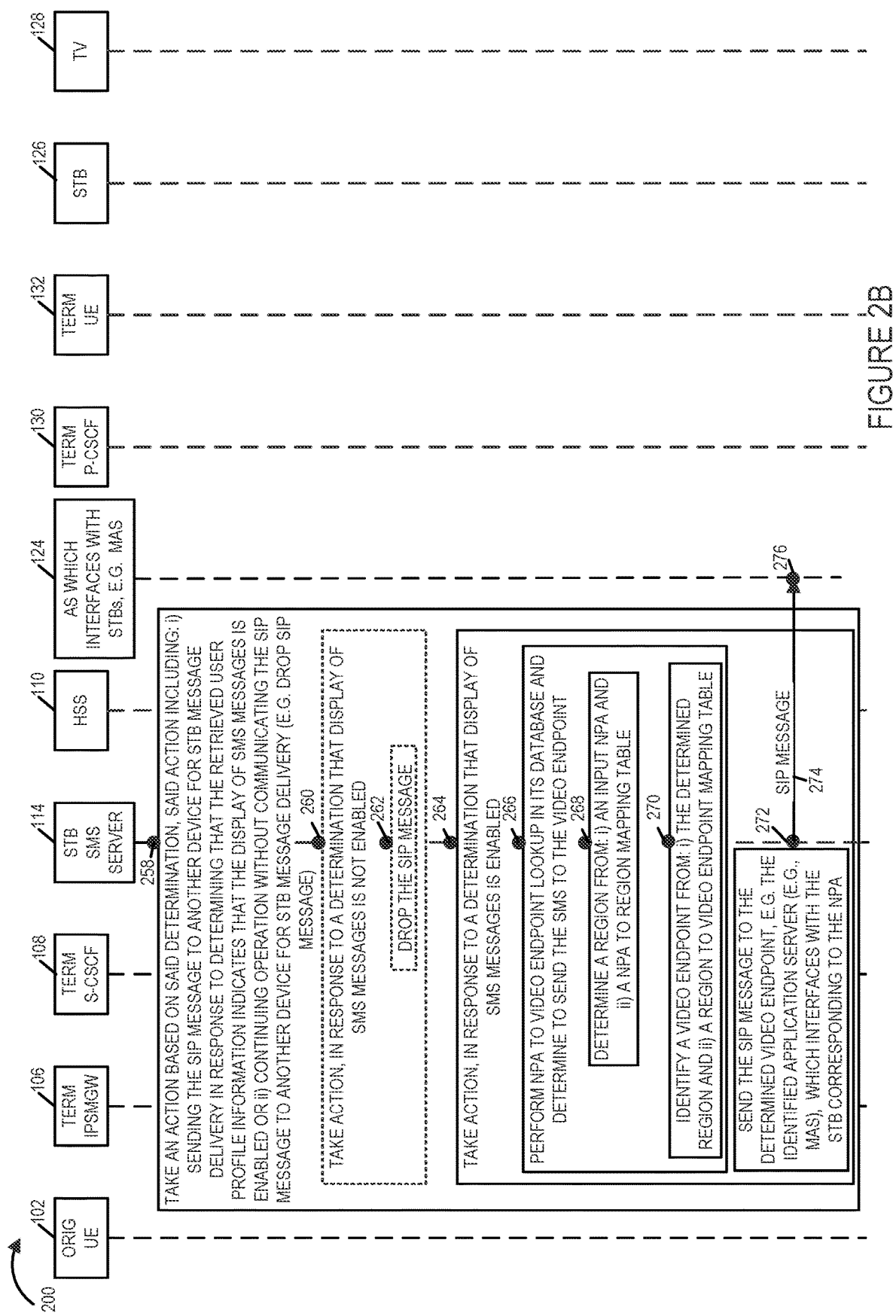
FIG. 2B is a second part of a signaling diagram illustrating an exemplary communications method including the conditional delivery of SMS message content to a TV via a set top box (STB), in addition to regular delivery of the SMS message content to a user equipment (UE), in accordance with an exemplary embodiment.

FIG. 2, comprising the combination of FIG. 2A, FIG. 2B and FIG. 2C, is a signaling diagram 200 illustrating an exemplary communications method in accordance with an exemplary embodiment. Exemplary signaling diagram 200 includes elements of the exemplary communications system 100 of FIG. 1 and further includes steps of an exemplary method and exemplary signals communicated between the various elements in accordance with an exemplary embodiment of the present invention.

In step 202, UE 1 102, which is an originating UE, generates and sends SIP message 204 including a SMS message to terminating Internet Protocol session management gateway (IPSMGW) 106. In step 206, the IPSMGW 106 receives the SIP message 204 including the SMS message. In step 208, the IPSMGW 106 generates and sends SIP message 210 including the SMS message to terminating Serving-Call Session Control Function (S-CSCF) 108. SMS message 210 is a forwarded copy of SIP message 204. In step 212 the terminating S-CSCF 108 receives SIP message 210, recovers the communicated information, and identifies the SIP message 210 includes a SMS message. In step 214, the terminating S-CSCF 108 invokes an initial filter criteria (IFC) for STB SMS server 114. Drawing 300 of FIG. 3 illustrates one example of an initial filtering criteria which is applied. In step 216, the terminating S-CSCF 108 determines, based on the IFC and the received SIP message including a SMS message, to send the received SIP message to a STB SMS server. For example, the trigger point condition specified in the IFC 300 has been met (satisfied) and the terminating S-CSCF 108 thus determines to send the SIP message including the SMS message to specified application server specified in the IFC, which is STB SMS server 114.

In step 218 the terminating S-CSCF 108 generates and sends SIP message 220 including the SMS message to STB SMS server 114. SIP message 220 is a forwarded copy of SIP message 210 including the SMS message. In step 222 the STB SMS server 114 receives SIP message 220 including the SMS message. SIP message 220 includes a target phone number (to which the SMS content is directed) and SMS message content.

In step 224, the terminating S-CSCF 108 generates and sends SIP message 226 including the SMS message to terminating P-CSCF 130. SIP message 226 is a forwarded copy of SIP message 210 including the SMS message. In step 228 the terminating P-CSCF 130 receives SIP message 226 including the SMS message. In step 230 the terminating P-CSCF 130 generates and sends SIP message 232 including the SMS message to UE 2 132, which is a terminating UE, with regard to a communications session between UE 1 102 and UE 2 132. In step 234 UE 2 132 receives SIP message 232 and recovers the communicated information including an SMS message and stores the received SMS message within memory of UE 2 132. In step 236 UE 2 132 displays the SMS message to the user of UE 2 132, e.g., in response to the user of UE 2 132 taking an action to initiate display of the message.

In step 238 the STB SMS server 114 reads the received SIP message 220 and extracts the target, e.g., called party, phone number to which the SMS message is directed.

In step 240 the STB SMS server 114 retrieves user profile information corresponding to the target phone number, said user profile information includes STB SMS display setting information. Step 240 includes steps 242 and 254. In step 242 the STB SMS server 114 sends, via a Sh:UDR interface, a user data request command 244 to HSS 110. In step 246 the HSS 110 receives the user data request command 244. In step 248 the HSS, in response to the received request 244, fetches subscriber profile information including a SMS display STB flag value. In step 250 the HSS 110 generates and sends, via a Sh:UDR interface, response message 252 including a user data answer command, said answer command including profile information corresponding to the target phone number and including a SMS display STB flag value, to STB SMS server 114. In step 254 the STB SMS server 114 receives the response message 252 including the user data answer command.

In step 255 the STB SMS server 114 determines from the received user profile information if STB display of SMS messages is enabled for a STB associated with the target phone number. Each iteration of step 255 includes step 256 and one of steps 257 and 257'. In step 256 the STB SMS server 114 performs a SMS_DISPLAY_STB FLAG check to determine if STB display is enabled. In step 257 the STB SMS server 114 determines, from said check, that the STB display of SMS messages is enabled (e.g., SMS_DISPLAY_STB flag value=1). In step 257' the STB SMS server 114 determines, from said check, that the STB display of SMS messages is not enabled (e.g., SMS_DISPLAY_STB flag value=1).

In step 258 the STB SMS server 114 takes an action based on the determination, said action including: i) sending the SIP message (including the SMS message) to another device for the STB message delivery in response to determining that the retrieved user profile information indicates that the display of SMS messages is enabled or ii) continuing operation without communicating the SIP message (including the SMS message) to another device for STB message delivery, e.g. drop the SIP message.

For each iteration of step 258 the STB SMS server 114 performs one of: i) step 260 or ii) steps 264 and 272. In step 260 the STB SMS server 114 takes action, in response to a determination that display of SMS messages is not enabled. Step 260 includes step 262, in which the STB SMS server drops the SIP message 220, which was received in step 222.

In step 264 the STB SMS server 114 takes an action in response to a determination that display of SMS messages is enabled. Step 264 includes step 266, in which the STB SMS server 114 performs a NPA to video endpoint lookup in its database and determines to send the SIP message including the SMS message to the video endpoint. Step 266 includes step 268 and step 270. In step 268 the STB SMS server 114 determines a region from an input NPA and ii) a NPA to region mapping table. In step 270 the STB SMS server 114 identifies a video endpoint from: i) the determined region and ii) a region to video endpoint mapping table. Operation proceeds from step 264 to step 272. In this example, the identified video endpoint is application server 124, which interfaces with STB 1 126.

In step 272 the STB SMS server 114 sends SIP message 274 including the SMS message, which is a forwarded copy of received SIP message 220 including the SMS message, to the determined video endpoint, e.g. the identified application server (AS) 124, e.g. the identified MAS, which interfaces with the STB corresponding to the NPA. In step 276, AS 124 receives SIP message 274 including the SMS message and recovers the communicated information including a SMS message. In step 278 AS 124 generates and sends a SIP 200 OK message 280 to STB SMS server 114, in response to previously received SIP message 220. In step 281 the STB SMS server 114 receives the SIP 200 OK message 280. In step 282 STB SMS server 114 generates and sends SIP 200 OK message 283 to terminating S-CSCF 108. In step 284 the terminating S-CSCF 108 receives the SIP 200 OK message 283.

In step 285 the AS 124, e.g., MAS 1 124, performs a phone number to STB MAC address lookup and determines to send the SMS to STB 2 126. In step 286 the AS 124, e.g., MAS 1 124, reads the received SIP message 220 including the SMS message and extract relevant header values for creating a message which the STB will use for display of the SMS message on television (TV). In step 287 the AS 124, e.g., MAS 1 124, creates a STB message. Step 287 includes step 2871 and step 288. In step 2871 the AS 124 includes SMS message content in the STB message. In step 289 the AS 124 optionally performs display enhancement operation(s) e.g., codes for displaying languages, and/or codes for display location. Step 288 includes step 289 in which the AS 124, performs a language translation operation. Step 288 includes step 290 in which the AS 124 generates a STB instruction used to control a STB to display a SMS message in a language different from the original SMS message language. In step 291 the AS 124 performs a message positioning operation. Step 291 includes step 292, in which the AS 124 generates a STB instruction used to control a STB to display a SMS message at a particular location, e.g., top right hand corner or center bottom, on a display.

In step 293 the AS 124 sends the generated STB message 294 including the SMS message content and optionally display enhancement information and/or display location information to STB 1 126, which is the identified STB from the phone number to STB MAC address lookup operation of step 285. In step 295 STB 1 126 receives STB message 294 and recovers the communicated information. In step 296 STB 1 126 codes for display format, e.g., location to display the SMS message on TV and for language. In step 296 STB 1 126 generates and sends message 298 to TV 1 128. Message 298 includes the SMS message, e.g., in the original language or in a translated language, and information indicating the location on a display of the TV, where the SMS message is to be displayed. In step 299 the TV 128 receives message 298, and in step 2991 the TV displays the SMS message on the TV display, e.g., at a specified location on the display, e.g., top right hand corner or center bottom, in a specified language.

FIG. 3 is a drawing 300 illustrating an exemplary initial filtering criteria (iFC) routine, which may be implemented by a device, e.g. a Serving-Call Session Control Function (S-CSCF) device (e.g., terminating S-CSCF 108), to determine whether or not a received SIP message including a SMS message should be forwarded to a Set Top Box (STB) Short Message Service (SMS) server (e.g., STB SMS server 114), in accordance with an exemplary embodiment. In this example, the priority level is set to 1. The trigger point condition type is conjunctive normal form (CNF)=1. For the trigger to occur, each service point group trigger condition needs to be satisfied. The group 0 condition is that Method indicates MESSAGE. The group 1 condition is the SIP header content type indicates application/vnd.3gpp.sms. The group 2 condition is that the Session Case indicates TERMINATING REGISTERED. If all of these conditions are satisfied, then the trigger occurs and the SIP message including the SMS message is sent (forwarded) to the application server with server name indicated by: sip:SMS_DISPLAY_STB.example.com:5060;transport=tcp (e.g., STB SMS server 114, which is an application server).

FIG. 4 is a drawing including an exemplary numbering plan area (NPA) to region mapping table 400 and an exemplary region to video endpoint mapping table 450 in accordance with an exemplary embodiment. First column 402 of NPA to region mapping table 400 includes NPA prefix value (first 3 digits of phone number), and the second column 404 of table 400 includes region names which correspond to NPA prefix values. NPA prefix value 720 corresponds to Colorado. NPA prefix value 972 corresponds to Texas. First column 452 of region to video endpoint mapping table 450 includes region names, and the second column 454 of table 450 includes information identifying video endpoints which correspond to regions. Colorado maps to video endpoint sip:colorado@1.2.3.4:5060, where 1.2.3.4 is a IPv4 address (e.g., IP address of MAS 1 124) and 5060 indicates standard User Date Protocol/Transmission Control Protocol (UDP/TCP) port. Texas maps to video endpoint sip:texas@5.6.7.8:5060, where 5.6.7.8 is a IPv4 address (e.g., IP address of MAS m 125) and 5060 indicates standard User UDP/TCP port.

FIG. 5 is a drawing illustrating exemplary video endpoint phone number MAC address mapping databases 500, 550. First video endpoint phone number to MAC address mapping database 500 corresponds to an exemplary first video endpoint sip:colorado@1,2,3,4:5060, e.g. MAS 1 124 for region 1. First column 502 includes a set of phone numbers, e.g., each phone number corresponding to a UE, and second column 504 includes MAC addresses corresponding to each of the phone numbers. A first phone number, e.g., the phone number for UE 2 132, maps to the MAC address for a 1st STB/TV, e.g., STB1 126/TV 1 128. A second phone number, e.g., the phone number for UE 3 139, maps to the MAC address for the 1st STB/TV, e.g., STB1 126/TV 1 128. A third phone number, e.g., the phone number for UE 4 141, maps to the MAC address for the 1st STB/TV, e.g., STB1 126/TV 1 128. A fourth phone number, e.g., the phone number for UE 5 162, maps to the MAC address for a 2nd STB/TV, e.g., STB n 127/TV 2 129. A fifth phone number, e.g., the phone number for UE 6 164, maps to the MAC address for the 2nd STB/TV, e.g., STB n 127/TV 2 129.

Second video endpoint phone number to MAC address mapping database 550 corresponds to an exemplary second video endpoint sip:texas@5,6,6,8:5060, e.g., MAS m 125 for region m. First column 552 includes a set of phone numbers, e.g., each phone number corresponding to a UE, and second column 554 includes MAC addresses corresponding to each of the phone numbers. A sixth phone number, e.g., the phone number for UE 7 166, maps to the MAC address for a 3rd STB/TV, e.g., STB 1A 131/TV 3 133. A seventh phone number, e.g., the phone number for UE 8 167, maps to the MAC address for a 3rd STB/TV, e.g., STB 1A 131/TV 3 133. An eighth phone number, e.g., the phone number for UE 9 168, maps to the MAC address for a 4th STB/TV, e.g., STB nA 135/TV 4 137. A ninth phone number, e.g., the phone number for UE 10 169, maps to the MAC address for the 4th STB/TV, e.g., STB nA 135/TV 4 137.

Figure 6:
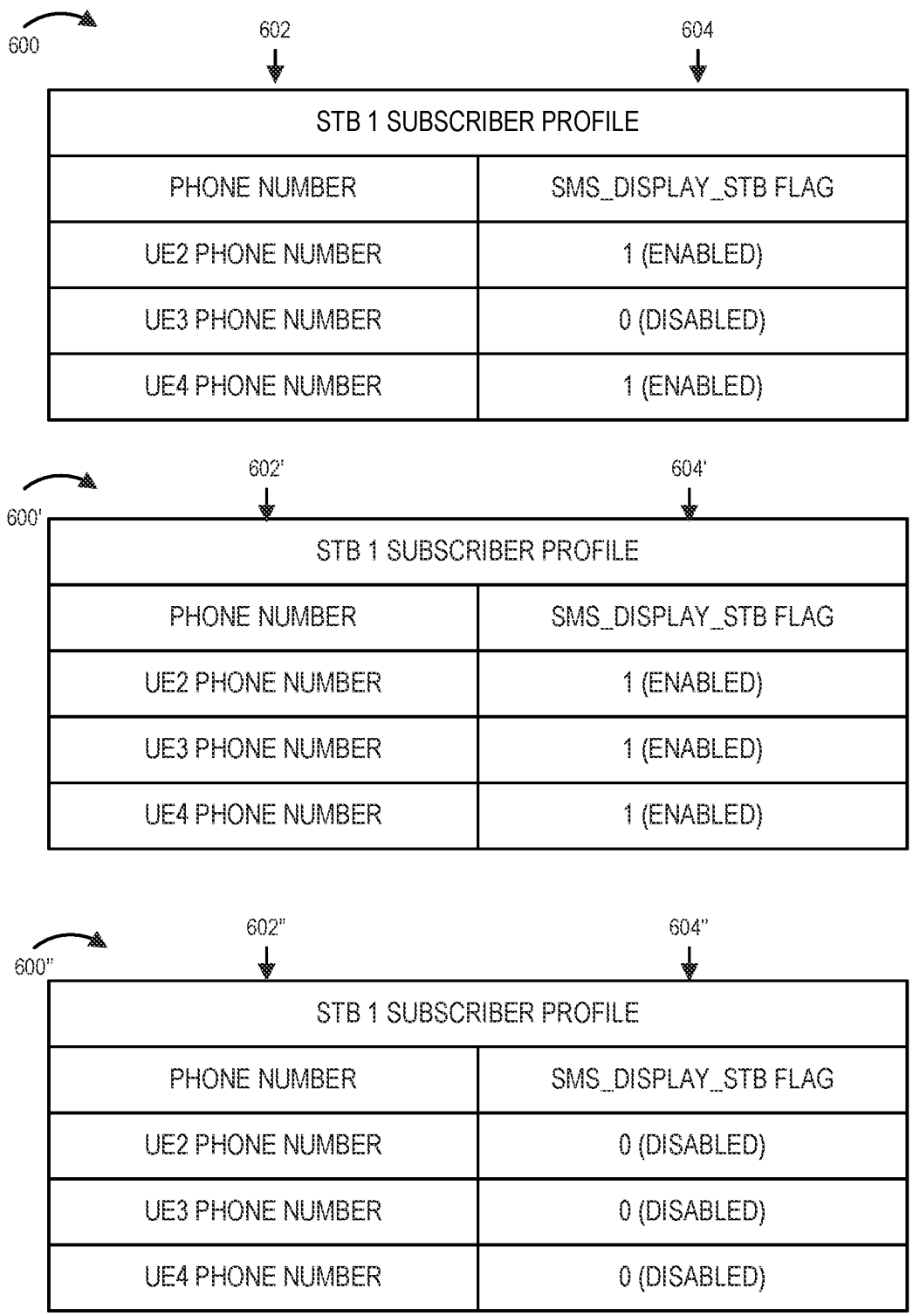
FIG. 6 is a drawing illustrating portions of exemplary alternative set top box 1 (STB 1) subscriber profiles in accordance with an exemplary embodiment.

FIG. 6 is a drawing illustrating portions of exemplary alternative subscriber profile information including set top box 1 (STB 1) subscriber profiles in accordance with an exemplary embodiment. The subscriber profiles are stored in an HSS, e.g., HSS 110 and accessed by a STB SMS server, e.g., STB SMS server 114. Table 600, corresponding to a first exemplary STB1 subscribe profiles includes a first column 602 including phone numbers, and a second column 604 including SMS_DISPLAY_STB FLAG values. The SMS_DISPLAY_STB flag value is set to 1 for UE 2 132 phone number, indicating that SMS message forwarding to STB1 126 for display on TV 1 128 is enabled for UE 2 132 target phone number. The SMS_DISPLAY_STB flag value is set to 0 for UE 3 139 phone number, indicating that SMS message forwarding to STB1 126 for display on TV 1 128 is disabled for UE 3 139 target phone number. The SMS_DISPLAY_STB flag value is set to 1 for UE 4 141 phone number, indicating that SMS message forwarding to STB1 126 for display on TV 1 128 is enabled for UE 4 141 target phone number.

Table 600', corresponding to a second exemplary STB1 subscribe profile includes a first column 602' including phone numbers, and a second column 604' including SMS_DISPLAY_STB FLAG values. The SMS_DISPLAY_STB flag value is set to 1 for UE 2 132 phone number, indicating that SMS message forwarding to STB1 126 for display on TV 1 128 is enabled for UE 2 132 target phone number. The SMS_DISPLAY_STB flag value is set to 1 for UE 3 139 phone number, indicating that SMS message forwarding to STB1 126 for display on TV 1 128 is enabled for UE 3 139 target phone number. The SMS_DISPLAY_STB flag value is set to 1 for UE 4 141 phone number, indicating that SMS message forwarding to STB1 126 for display on TV 1 128 is enabled for UE 4 141 target phone number.

Table 600", corresponding to a third exemplary STB1 subscribe profile includes a first column 602" including phone numbers, and a second column 604" including SMS_DISPLAY_STB FLAG values. The SMS_DISPLAY_STB flag value is set to 0 for UE 2 132 phone number, indicating that SMS message forwarding to STB1 126 for display on TV 1 128 is disabled for UE 2 132 target phone number. The SMS_DISPLAY_STB flag value is set to 0 for UE 3 139 phone number, indicating that SMS message forwarding to STB1 126 for display on TV 1 128 is disabled for UE 3 139 target phone number. The SMS_DISPLAY_STB flag value is set to 0 for UE 4 141 phone number, indicating that SMS message forwarding to STB1 126 for display on TV 1 128 is disabled for UE 4 141 target phone number.

Figure 7:
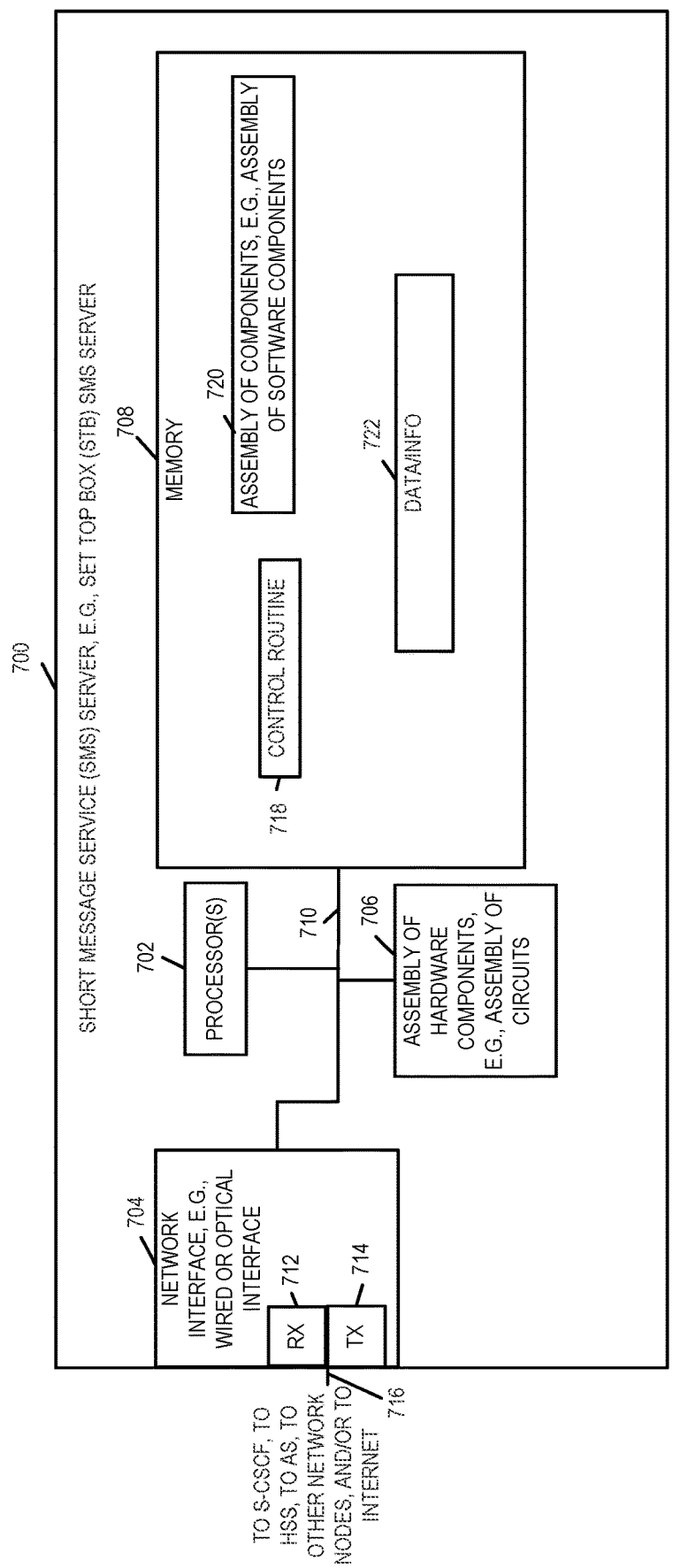
FIG. 7 is a drawing of an exemplary short message service (SMS) server, e.g., a set top box (STB) SMS server, in accordance with an exemplary embodiment.

FIG. 7 is a drawing of an exemplary short message service (SMS) server 700, e.g., a set top box (STB) SMS server, in accordance with an exemplary embodiment. SMS server 700 is, e.g., STB SMS server 114 of FIGS. 1 and 2.

SMS server 700 includes one or more processors 702, e.g., a CPU, a network interface 704, e.g., a wired or optical interface, an assembly of hardware components 706, e.g., an assembly of circuits, and memory 708, coupled together via a bus 710 over which the various elements may interchange data and information. Network interface 704 includes a receiver 712 and a transmitter 714 coupled to connector 716, via which the SMS server 700 may communicate with (send signals to and receive signals from) a S-CSCF, a HSS, an AS, other network nodes and/or the Internet. Memory 708 includes a control routine 718, an assembly of components 720, e.g., an assembly of software components, and data/information 722. Control routine 718, is executed by processor 702 to implement basic operational functions of device 700, e.g., initialize/boot-up device 700, control read and write from memory, control the network interface, etc. Assembly of components 720, e.g., an assembly of software components, includes, e.g., routines, subroutines, software modules, applications, etc., which when executed by processor 702 control device 700 to implement steps of an exemplary method, e.g., steps of the method of signaling diagram 200 of FIG. 2 performed by STB SMS server 114. Data/information 722 includes phone number to video endpoint mapping information, e.g., information 116 including a NPA to region mapping database 118 including a NPA to region mapping table 120 (e.g., table 400 of FIG. 4) and a region to video endpoint mapping table 122 (e.g., table 450 of FIG. 4).

Figure 8:
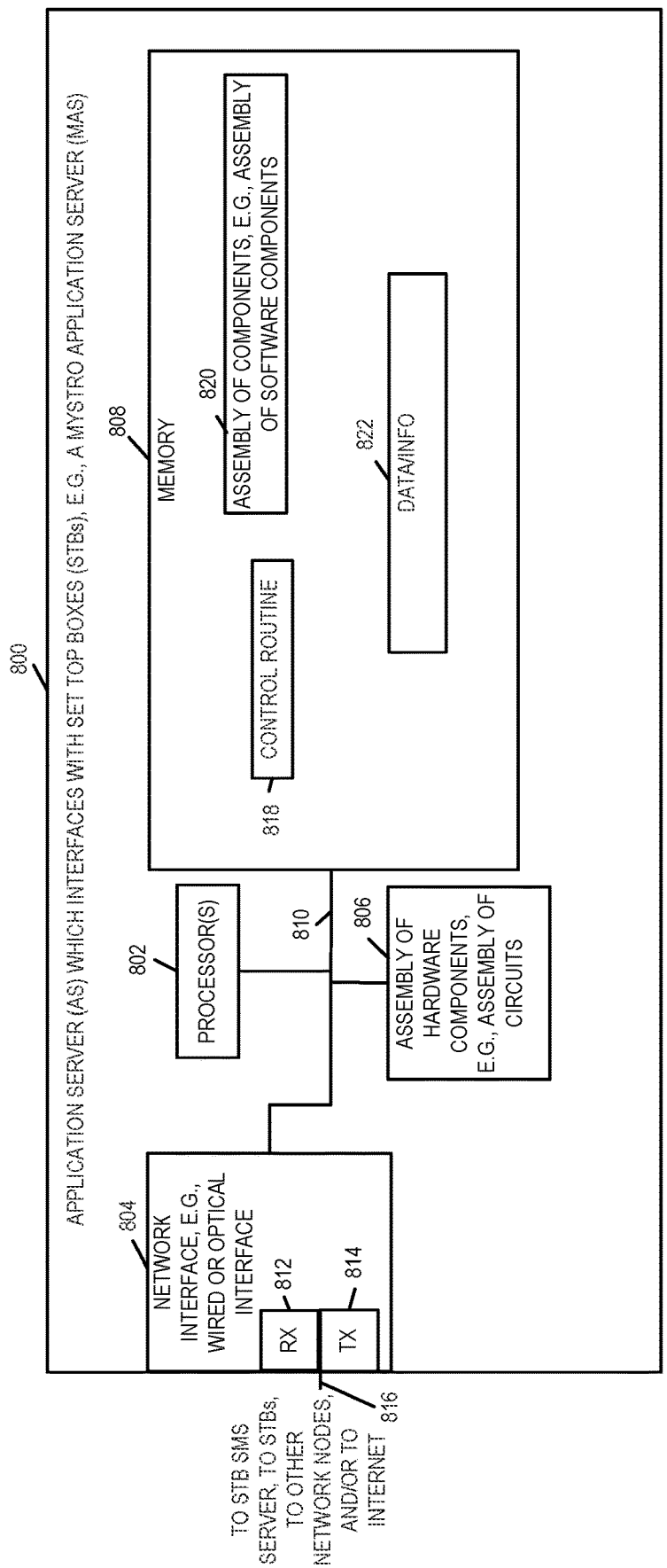
FIG. 8 is a drawing of an exemplary application server (AS) which interfaces with set top boxes (STBs), e.g., a Mystro Application Server (MAS), in accordance with an exemplary embodiment.

FIG. 8 is a drawing of an exemplary application server (AS) 800 which interfaces with set top boxes (STBs), e.g., a MAS, in accordance with an exemplary embodiment. AS 800 is, e.g., any of MAS 1 124 of FIGS. 1 and 2, or MAS m 125 of FIG. 1.

AS server 800 includes one or more processors 802, e.g., a CPU, a network interface 804, e.g., a wired or optical interface, an assembly of hardware components 806, e.g., an assembly of circuits, and memory 808, coupled together via a bus 810 over which the various elements may interchange data and information. Network interface 804 includes a receiver 812 and a transmitter 814 coupled to connector 816, via which the AS server 800 may communicate with (send signals to and receive signals from) a STB SMS server, STBs, other network nodes and/or the Internet. Memory 808 includes a control routine 818, an assembly of components 820, e.g., an assembly of software components, and data/information 822. Control routine 818, is executed by processor 802 to implement basic operational functions of device 800, e.g., initialize/boot-up device 800, control read and write from memory, control the network interface, etc. Assembly of components 820, e.g., an assembly of software components, includes, e.g., routines, subroutines, software modules, applications, etc., which when executed by processor 802 control device 800 to implement steps of an exemplary method, e.g., steps of the method of signaling diagram 200 of FIG. 2 performed by MAS 1 124. Data/information 822 includes a phone number to MAC address mapping database, e.g., phone number to MAC address mapping database 500 of 550 of FIG. 5.

Figure 9:
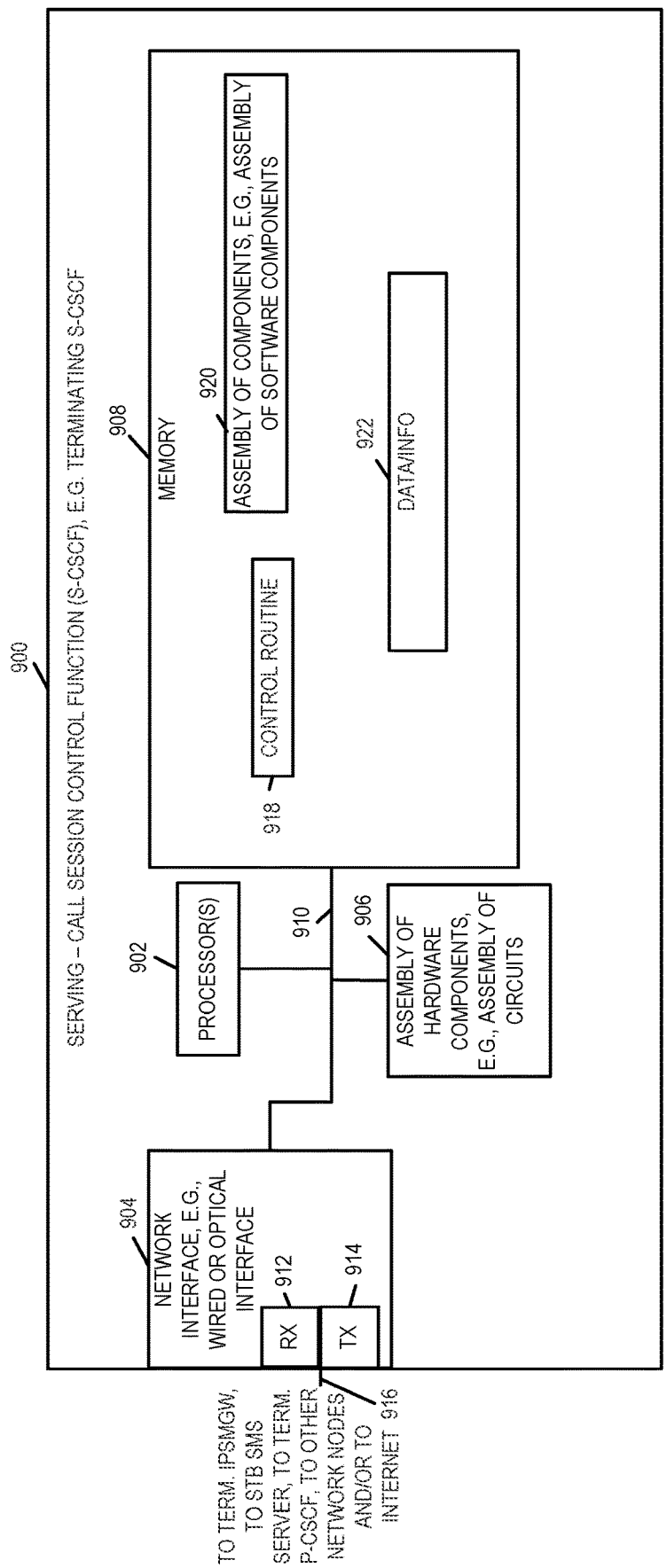
FIG. 9 is a drawing of an exemplary Serving-Call Session Control Function (S-CSCF), e.g., a terminating S-CSCF, in accordance with an exemplary embodiment.

FIG. 9 is a drawing of an exemplary Serving-Call Session Control Function (S-CSCF) 900, e.g., a terminating S-CSCF, in accordance with an exemplary embodiment. S-CSCF 900 is, e.g., terminating S-CSCF 108 of FIG. 1 and FIG. 2.

S-CSCF 900 includes one or more processors 902, e.g., a CPU, a network interface 904, e.g., a wired or optical interface, an assembly of hardware components 906, e.g., an assembly of circuits, and memory 908, coupled together via a bus 910 over which the various elements may interchange data and information. Network interface 904 includes a receiver 912 and a transmitter 914 coupled to connector 916, via which the S-CSCF 900 may communicate with (send signals to and receive signals from) a terminating IPSMGW, a terminating P-CSCF, other network nodes and/or the Internet. Memory 908 includes a control routine 918, an assembly of components 820, e.g., an assembly of software components, and data/information 922.

Control routine 918, is executed by processor 802 to implement basic operational functions of device 900, e.g., initialize/boot-up device 900, control read and write from memory, control the network interface, etc. Assembly of components 920, e.g., an assembly of software components, includes, e.g., routines, subroutines, software modules, applications, etc., which when executed by processor 902 control device 900 to implement steps of an exemplary method, e.g., steps of the method of signaling diagram 200 of FIG. 2 performed by S-CSCF 108. Data/information 822 includes, e.g., a received SIP message including a SMS message, which is to undergo initial filtering to determine if it should be forwarded to a STB SMS server, e.g., STB SMS server 114. Memory 908 includes an initial filtering criteria routine, e.g. IFC routine 300 of FIG. 3 and/or a set of information to be used by an initial filtering routine, e.g. information indicating: an initial filtering criteria priority, e.g. priority 1, information indicating a trigger point condition type, e.g. conjunctive normal form (CNF), information indicating group information, e.g. information indicating service point triggers (SPTs), e.g. information indicating a method, e.g., MESSAGE, information indicating SIP header content type, e.g., application/vnd.3gpp.sms, information indicating session case, e.g. Terminating Registered, and information indicating an application server name to which the SIP message including the SMS message is to routed to, if the trigger is satisfied, sip:SMS_DISPLAY_STB.example.com:5060;transport=tcp (information corresponding to STB SMS server 124).

Figure 10:
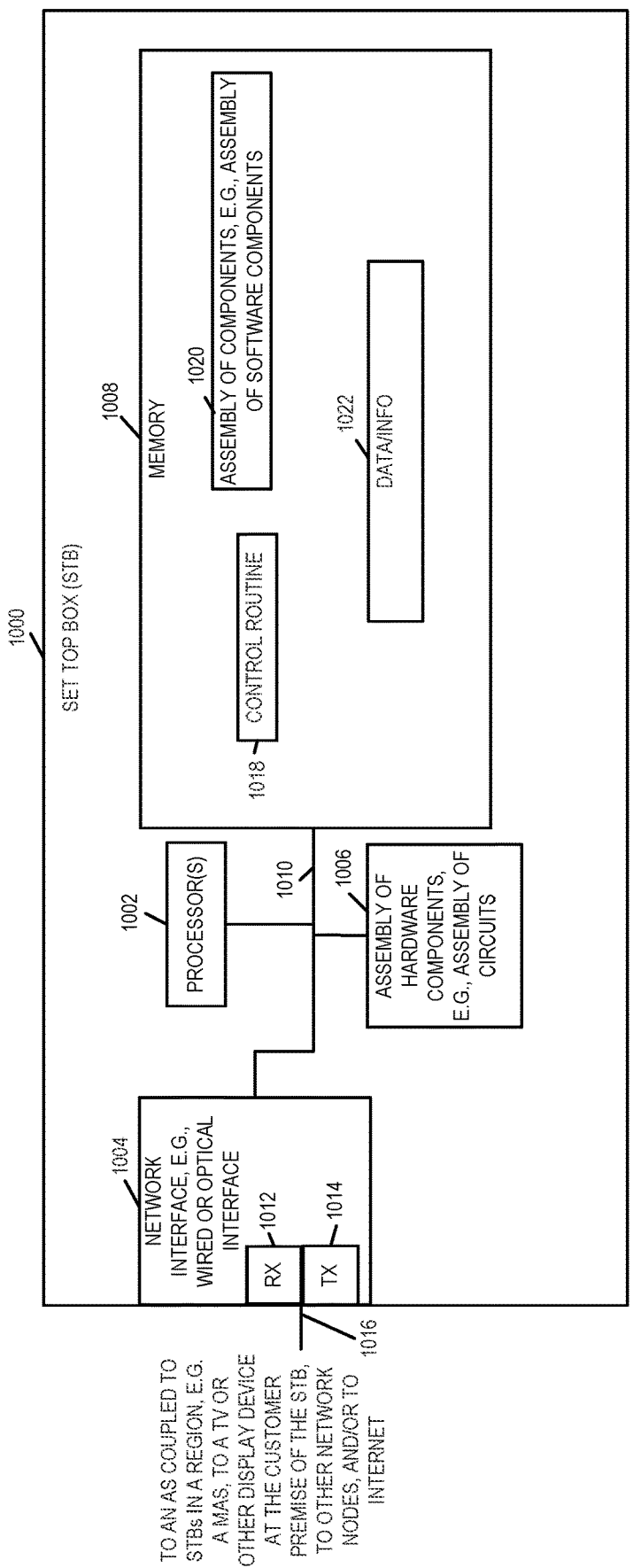
FIG. 10 is a drawing of an exemplary set top box (STB) in accordance with an exemplary embodiment.

FIG. 10 is a drawing of an exemplary set top box (STB) 1000 in accordance with an exemplary embodiment. STB 1000 is, e.g., any of STB 1 126 of FIGS. 1 and 2, STB n 127 of FIG. 1, STB 1A 131 of FIG. 1, or STB nA 135 of FIG. 1.

STB 1000 includes one or more processors 1002, e.g., a CPU, a network interface 1004, e.g., a wired or optical interface, an assembly of hardware components 1006, e.g., an assembly of circuits, and memory 1008, coupled together via a bus 1010 over which the various elements may interchange data and information. Network interface 1004 includes a receiver 1012 and a transmitter 1014 coupled to connector 1016, via which the STB 1000 may communicate with (send signals to and receive signals from) an application server coupled to a set of STBs in a region including STB 1000, e.g., MAS 1 124, a TV or other display device at the customer premise of STB 1000, other network nodes and/or the Internet. Memory 1008 includes a control routine 1018, an assembly of components 1020, e.g., an assembly of software components, and data/information 1022.

Control routine 1018, is executed by processor 1002 to implement basic operational functions of device 1000, e.g., initialize/boot-up device 1000, control read and write from memory, control the network interface, etc. Assembly of components 1020, e.g., an assembly of software components, includes, e.g., routines, subroutines, software modules, applications, etc., which when executed by processor 1002 control device 1000 to implement steps of an exemplary method, e.g., steps of the method of signaling diagram 200 of FIG. 2 performed by STB 1 126. Exemplary data/information 1022 includes a received STB message from MAS 1 124 including, a target phone number, SMS message content and control information, e.g., language information and SMS message positioning information, e.g., for locating and/or sizing a picture in picture (PIP), which is to display the SMS on a TV display. Data information 1022 further includes generated signals to be sent to the display device, e.g., TV 1 128 coupled to the STB 1000, to control the display device, e.g., TV, to the display the SMS message in accordance with the received control information, e.g., at a particular location in a particular language. In some embodiments, the generated signals further include the target phone number and/or information identifying a target individual, e.g., a name of the owner of the phone, associated with the target phone number to be displayed with the SMS message content, and/or metadata, e.g., time tag information and/or source information corresponding to SMS message to also be optionally displayed with the SMS message.

Figure 11:
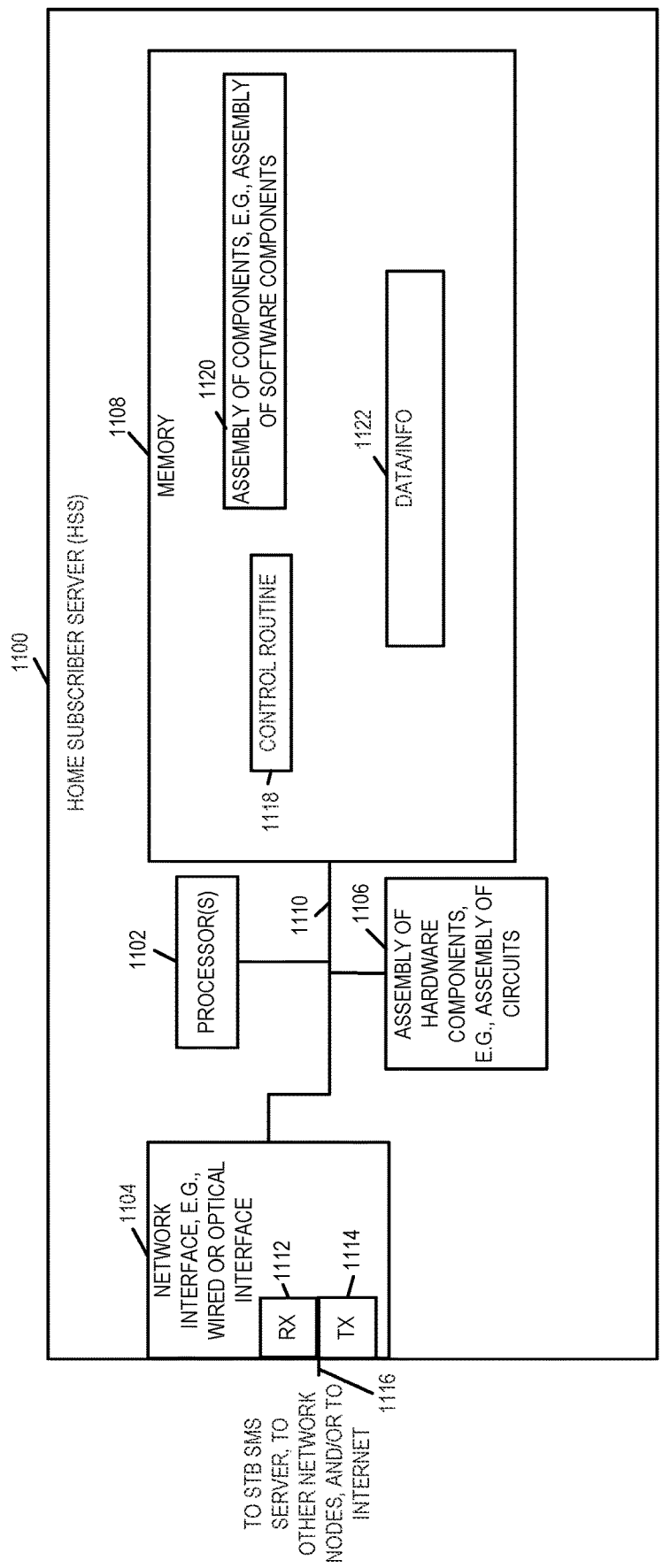
FIG. 11 is a drawing of an exemplary Home Subscriber Server (HSS) in accordance with an exemplary embodiment.

FIG. 11 is a drawing of an exemplary Home Subscriber Server (HSS) 1100 in accordance with an exemplary embodiment. HSS 1100 is, e.g., HSS 110 of FIGS. 1 and 2. HSS 1100 includes one or more processors 1102, e.g., a CPU, a network interface 1104, e.g., a wired or optical interface, an assembly of hardware components 1106, e.g., an assembly of circuits, and memory 1108, coupled together via a bus 1110 over which the various elements may interchange data and information. Network interface 1104 includes a receiver 1112 and a transmitter 1114 coupled to connector 1116, via which the HSS 1100 may communicate with (send signals to and receive signals from) a STB SMS server, other network nodes and/or the Internet. Memory 1108 includes a control routine 1118, an assembly of components 1120, e.g., an assembly of software components, and data/information 1122.

Control routine 1118, is executed by processor 1102 to implement basic operational functions of device 1100, e.g., initialize/boot-up device 1100, control read and write from memory, control the network interface, etc. Assembly of components 1120, e.g., an assembly of software components, includes, e.g., routines, subroutines, software modules, applications, etc., which when executed by processor 1102 control device 1100 to implement steps of an exemplary method, e.g., steps of the method of signaling diagram 200 of FIG. 2 performed by HSS 110. Data information 1122 includes subscriber profiles 112, e.g., subscriber profile information including SMS_DISPLAY_STB flag values corresponding to subscriber phone numbers such as shown in the examples of FIG. 6.

Figure 12:
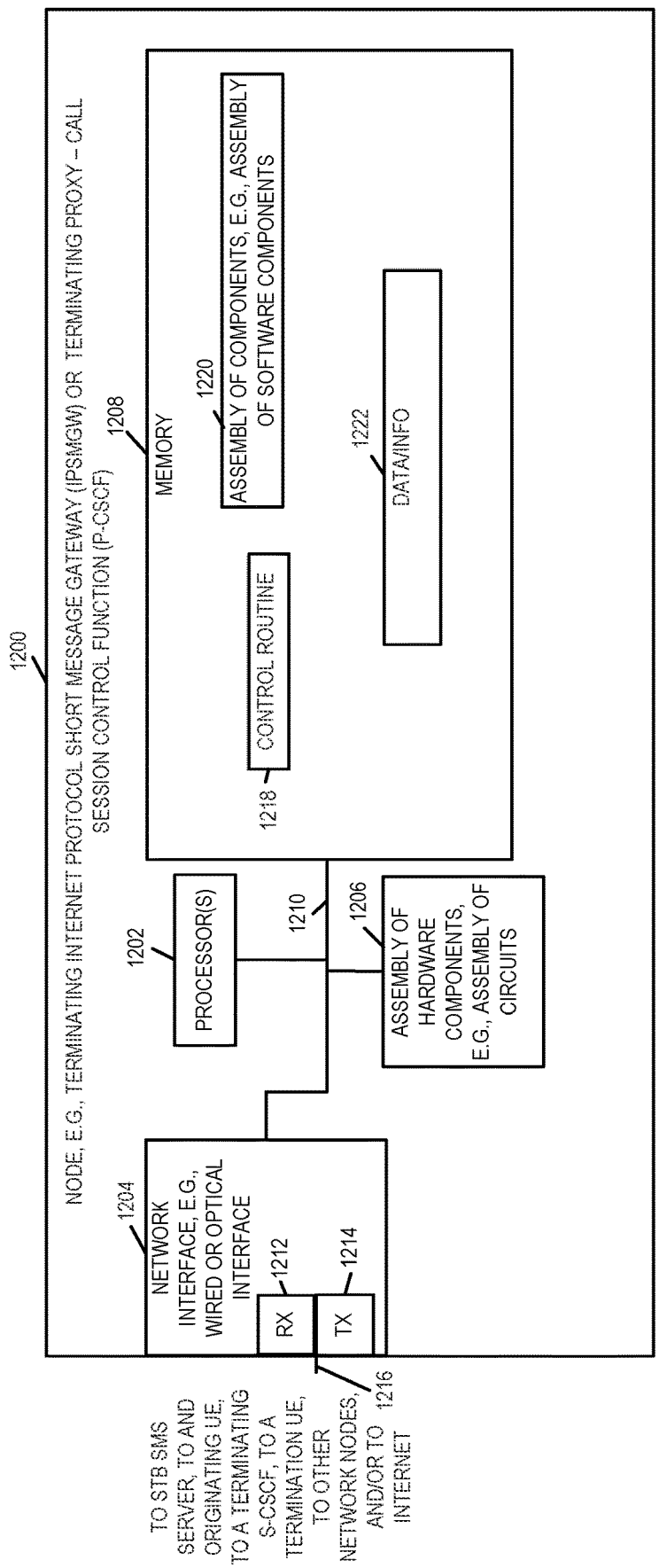
FIG. 12 is a drawing of an exemplary node, e.g., a terminating Internet Protocol Short Message Gateway (IP-SMGW) or a terminating Proxy-Call Session Control Function (P-CSCF), in accordance with an exemplary embodiment.

FIG. 12 is a drawing of an exemplary node 1200, e.g., a terminating Internet Protocol Short Message Gateway (IP-SMGW) or a terminating Proxy-Call Session Control Function (P-CSCF), in accordance with an exemplary embodiment. Node 1200 is, e.g., any of terminating IPSMGW 106 of FIGS. 1 and 2, or terminating P-CSCF 130 of FIGS. 1 and 2.

Node 1200 includes one or more processors 1202, e.g., a CPU, a network interface 1204, e.g., a wired or optical interface, an assembly of hardware components 1206, e.g., an assembly of circuits, and memory 1208, coupled together via a bus 1210 over which the various elements may interchange data and information. Network interface 1204 includes a receiver 1212 and a transmitter 1214 coupled to connector 1216, via which the node 1200 may communicate with (send signals to and receive signals from) a STB SMS server, an originating UE, a terminating S-CSCF, a terminating UE, other network nodes and/or the Internet. Memory 1208 includes a control routine 1218, an assembly of components 1220, e.g., an assembly of software components, and data/information 1222.

Control routine 1218, is executed by processor 1202 to implement basic operational functions of device 1200, e.g., initialize/boot-up device 1200, control read and write from memory, control the network interface, etc. Assembly of components 1220, e.g., an assembly of software components, includes, e.g., routines, subroutines, software modules, applications, etc., which when executed by processor 1202 control device 1200 to implement steps of an exemplary method, e.g., steps of the method of signaling diagram 200 of FIG. 2 performed by terminating IPSMGW 106 or terminating P-CSCF 130.

Figure 13:
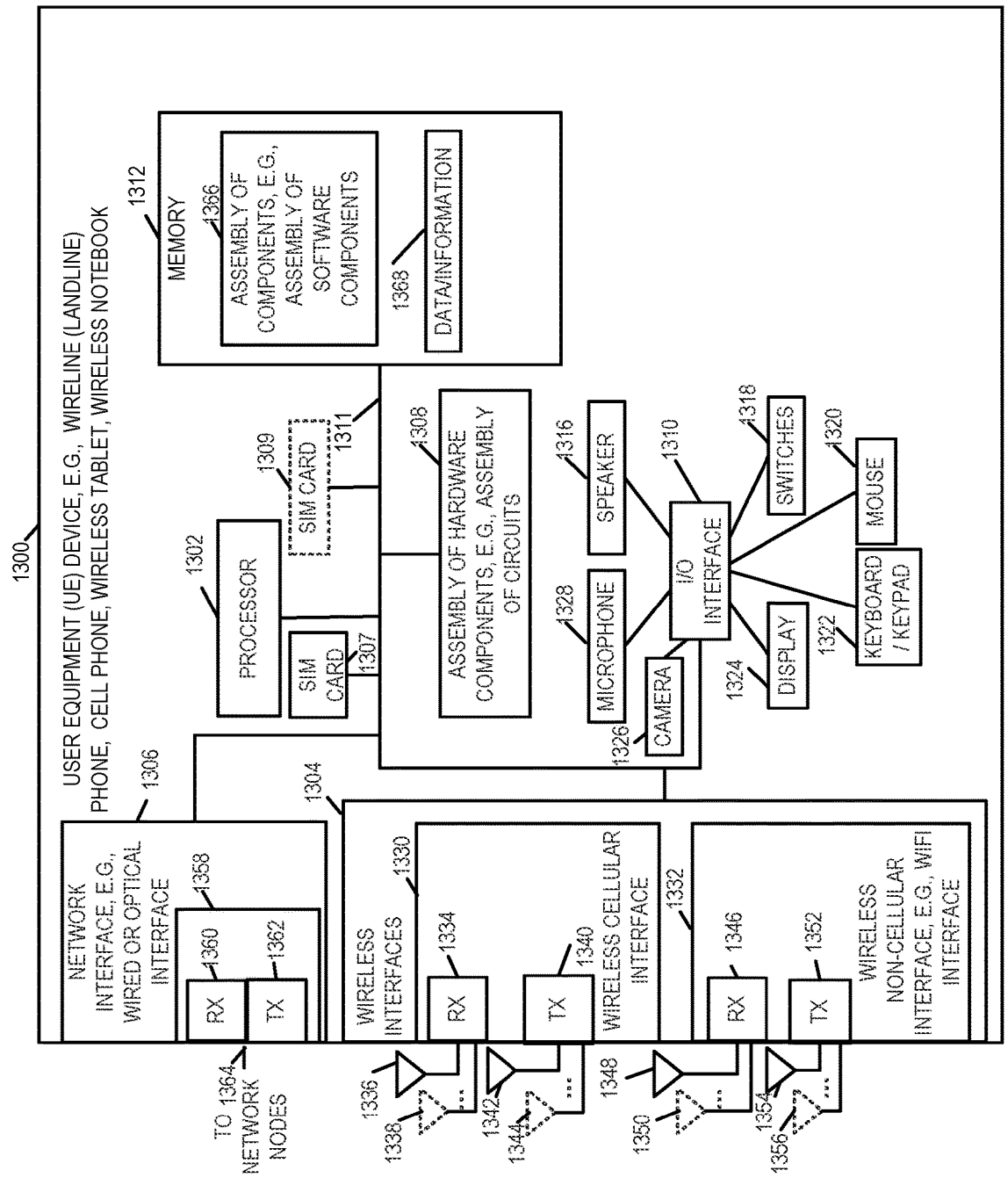
FIG. 13 is a drawing of an exemplary user equipment (UE) device, e.g., wireline (landline) phone, a cell phone, wireless tablet, or wireless notebook, in accordance with an exemplary embodiment.

FIG. 13 is a drawing of an exemplary user equipment (UE) device 1300, e.g., wireline (landline) phone, a cell phone, wireless tablet, or wireless notebook, in accordance with an exemplary embodiment. UE 1300 is, e.g., any of originating UE 1 102 of FIGS. 1 and 2, terminating UE 2 132 of FIGS. 1 and 3, UE 5 162 of FIG. 1, UE 6 164 of FIG. 1, UE 7 166 of FIG. 1, UE 8 167 of FIG. 1, UE 9 168 of FIG. 1, or UE 10 169 of FIG. 1.

UE 1300 includes a processor 1302, e.g., a CPU, wireless interfaces 1304, a network interface 1306, a subscriber identity module (SIM) card 1307, an assembly of hardware components 1308, e.g., an assembly of circuits, an I/O interface 1312, and memory 1312 coupled together via bus 1311 over which the various elements may exchange data and information. In some embodiments, UE 1300, e.g., a dual subscriber dual SIM UE device, includes a second SIM card 1309 coupled to bus 1311. UE 1300 further includes a plurality of I/O devices (speaker 1316, switches 1318, mouse 1320, keyboard/keypad 1322, display 1324, e.g., a touch screen display, camera 1326, and microphone 1328 coupled to the I/O interface 1310, via which the various I/O devices are coupled to bus 1311 and to other elements of UE 1300.

Network interface 1306, e.g., a wired or optical interface includes a receiver 1360, a transmitter 1362 and a connector 1364. In some embodiments, the receiver 1360 and transmitter 1362 are part of a transceiver 1358, e.g., a transceiver chip. Network interface 1306 allows the UE 1300 to be coupled to network devices and/or the Internet via connector 1364 and a landline connection (e.g., cable line or optical line) when such a connection is available to be used by the UE 1300.

Wireless interface 1304 includes a wireless cellular interface 1330 and a wireless non-cellular interface 1332, e.g., a WiFi interface. Wireless cellular interface 1330 includes a wireless receiver 1334 and a wireless transmitter 1340. Wireless receiver 1334 is coupled to one or more receive antennas or antenna elements (1336, 1338) via which the UE 1300 may receive wireless signals, e.g., from a cellular base station. Wireless transmitter 1340 is coupled to one or more transmit antennas or antenna elements (1342, 1344) via which the UE 1300 may transmit wireless signals, e.g., to a cellular base station, which couples the UE to the Internet and/or to other network nodes.

Wireless non-cellular interface 1332, e.g., a WiFi interface, includes a wireless receiver 1346 and a wireless transmitter 1352. Wireless receiver 1346 is coupled to one or more receive antennas or antenna elements (1348, 1350) via which the UE 1300 may receive wireless signals, e.g., from a WiFi access point, which couples the UE 1300 to the Internet and/or to other network nodes. In some embodiments, the WiFi access point is at the customer premise of UE 1300, e.g., coupled to the STB located at the customer premises. In some embodiments, the WiFi AP and the STB are part of a combined device at the customer premises, e.g., which interfaces with a service provider cable or fiber optic network Wireless transmitter 1352 is coupled to one or more transmit antennas or antenna elements (1354, 1356) via which the UE 1300 may transmit wireless signals, e.g., to a WiFi access point.

Memory 1312 includes an assembly of components 1366, e.g., an assembly of software components, and data/information 1368. Assembly of components 1366 includes a control routine which when executed by processor 1302 controls the UE 1300 to implement basic operational functions of device 1300, e.g., initialize/boot-up device 1300, control read and write from memory, control the network and/or wireless interface, etc. Assembly of components 1366, e.g., an assembly of software components, includes, e.g., routines, subroutines, software modules, applications, etc., which when executed by processor 1302 control UE 1300 to implement steps of an exemplary method, e.g., steps of the method of signaling diagram 200 of FIG. 2 performed by a UE, e.g., originating UE 1 102 or terminating UE 2 132.

Figure 14:
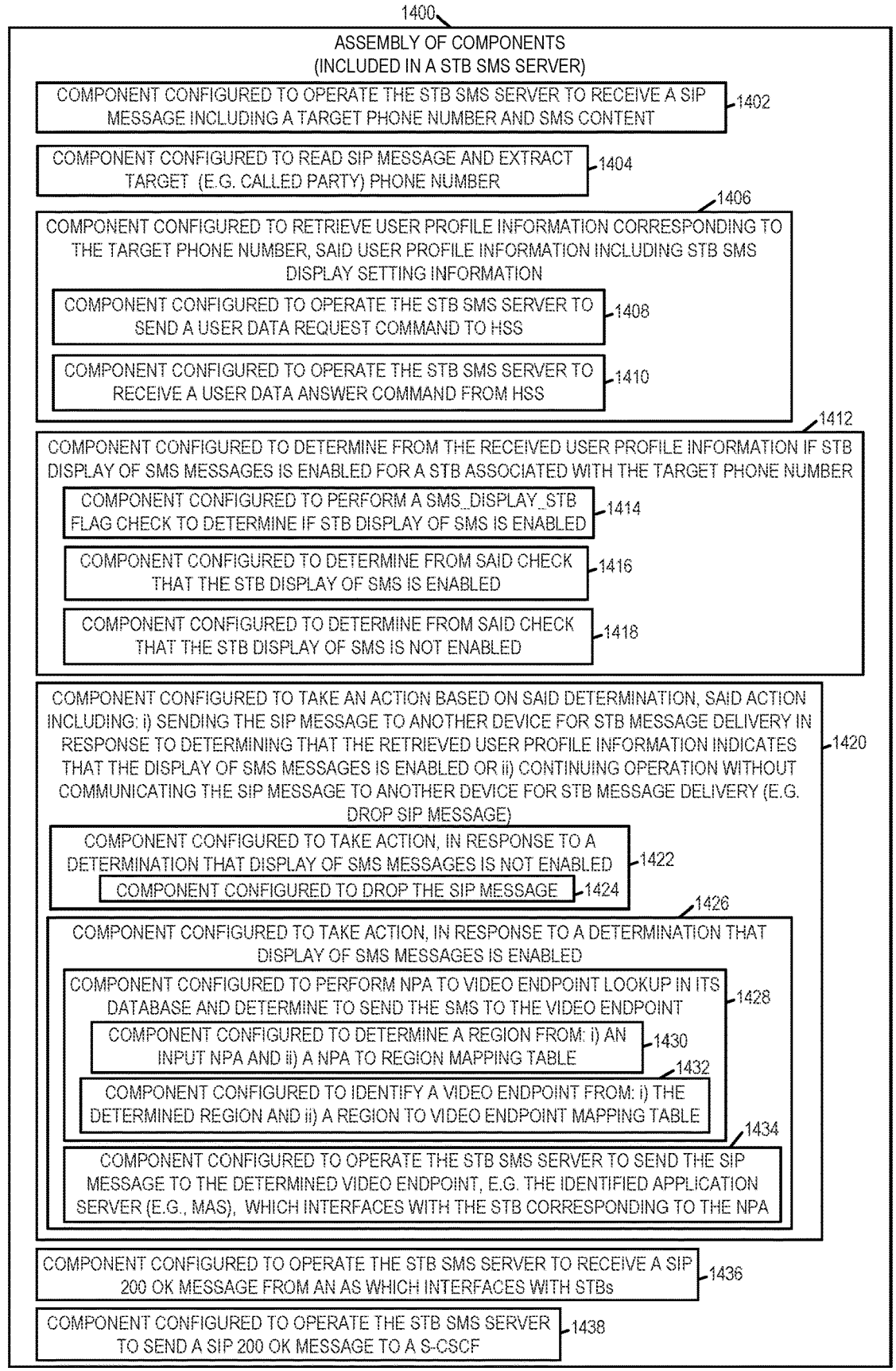
FIG. 14 is a drawing of an exemplary assembly of components which may be included in a SMS server, e.g., a STB SMS server, in accordance with an exemplary embodiment.

FIG. 14 is a drawing of an exemplary assembly of components 1400 which may be included in a SMS server, e.g., a STB SMS server, in accordance with an exemplary embodiment. For example, assembly of components 1440 is includes in STB SMS server 114 of FIGS. 1 and 2 and/or in SMS server 700, e.g., a STB SMS server of FIG. 7.

The components in the assembly of components 1400 can be, and in some embodiments are, implemented fully in hardware within a processor, e.g., processor 702, e.g., as individual circuits. The components in the assembly of components 1400 can be, and in some embodiments are, implemented fully in hardware within the assembly of hardware components 706, e.g., as individual circuits corresponding to the different components. In other embodiments some of the components are implemented, e.g., as circuits, within processor 702 with other components being implemented, e.g., as circuits within assembly of components 706, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 708 of the SMS server 700, with the components controlling operation of SMS server 700 to implement the functions corresponding to the components when the components are executed by a processor e.g., processor 702. In some such embodiments, the assembly of components 1400 is included in the memory 708 as part of an assembly of software components 720. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 1400 is stored in the memory 708, the memory 708 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the SMS server 700 or elements therein such as the processor 702, to perform the functions of corresponding steps illustrated in the signaling diagrams and/or described with respect to any of the Figures. Thus, the assembly of components 1400 includes various components that perform functions of corresponding one or more described and/or illustrated steps of an exemplary method, e.g., steps of the method of signaling diagram 200 of FIG. 2.

Assembly of components 1400 includes a component 1402 configured to operate the STB SMS server to receive a SIP message including a target phone number and SMS content, a component 1404 configured to read the received SIP message and extract target, e.g., called party, phone number, and a component 1406 configured to retrieve user profile information corresponding to the target phone number, said user profile information including STB display setting information. Component 1406 includes a component 1408 configured to operate the STB SMS server to send a user data request command to a HSS and a component 1410 configured to operate the STB SMS server to receive a user data answer command from the HSS.

Assembly of components 1400 further includes a component 1412 configured to determine from the received user profile information obtained from the HSS if STB display of SMS messages is enabled for a STB associated with the target phone number. Component 1412 includes a component 1414 configured to perform a SMS_Display_STB flag check to determine if STB display of SMS is enabled, a component 1416 configured to determine from said check that the STB display of SMS messages is enabled, e.g. in response to a determination that the SMS_DISPLAY_STB flag in the received configuration information corresponding to the target phone number is equal to 1, and a component 1418 configured to determine from said check that the STB display of SMS is not enabled, e.g. in response to a determination that the SMS_DISPLAY_STB flag in the received configuration information corresponding to the target phone number is equal to 0.

Assembly of components 1400 further includes a components 1420 configured to take an action based on said determination, said action including: i) send the SIP message to another device for STB message delivery in response to determining that the retrieved user profile information indicates that the display of SMS messages is enabled, or ii) continuing operation without communicating the SIP message to another device for STB message delivery, e.g. drop the SIP message, in response to determining that the retrieved user profile information indicates that the display of SMS messages is not enabled. Component 1420 includes a component 1422 configured to take action in response to a determination that the display of messages is not enabled. Component 1422 includes a component 1424 configured to drop the SIP message including the SMS message. Component 1420 further includes a component 1426 configured to take action in response to determining that the display of SMS messages is enabled. Component 1426 includes a component 1428 configured to perform a NPA to video endpoint lookup in its database and determine to send the video endpoint identified by the lookup, and a component 1434 configured to operate the STB SMS server to send the SIP message including the SMS message to the determined video endpoint, e.g., the identified application server, e.g., identified MAS, which interfaces with the STB corresponding to the NPA. Component 1428 includes a component 1430 configured to determine a region from: i) an input NPA prefix value, and a NPA to region mapping table, and a component 1432 configured to identify a video endpoint from: i) the determined region and ii) a region to video endpoint mapping table.

Assembly of components 1400 further includes a component 1436 configured to operate the STB SMS server to receive a SIP 200 OK message from an application server (AS) which interface with STBs, e.g., in response to the SIP message including the SMS message sent to the AS, and a component 1438 configured to operate the STB SMS server to send a SIP OK message to the S-CSCF in response to the received SIP 200 OK message from the AS.

Figure 15:
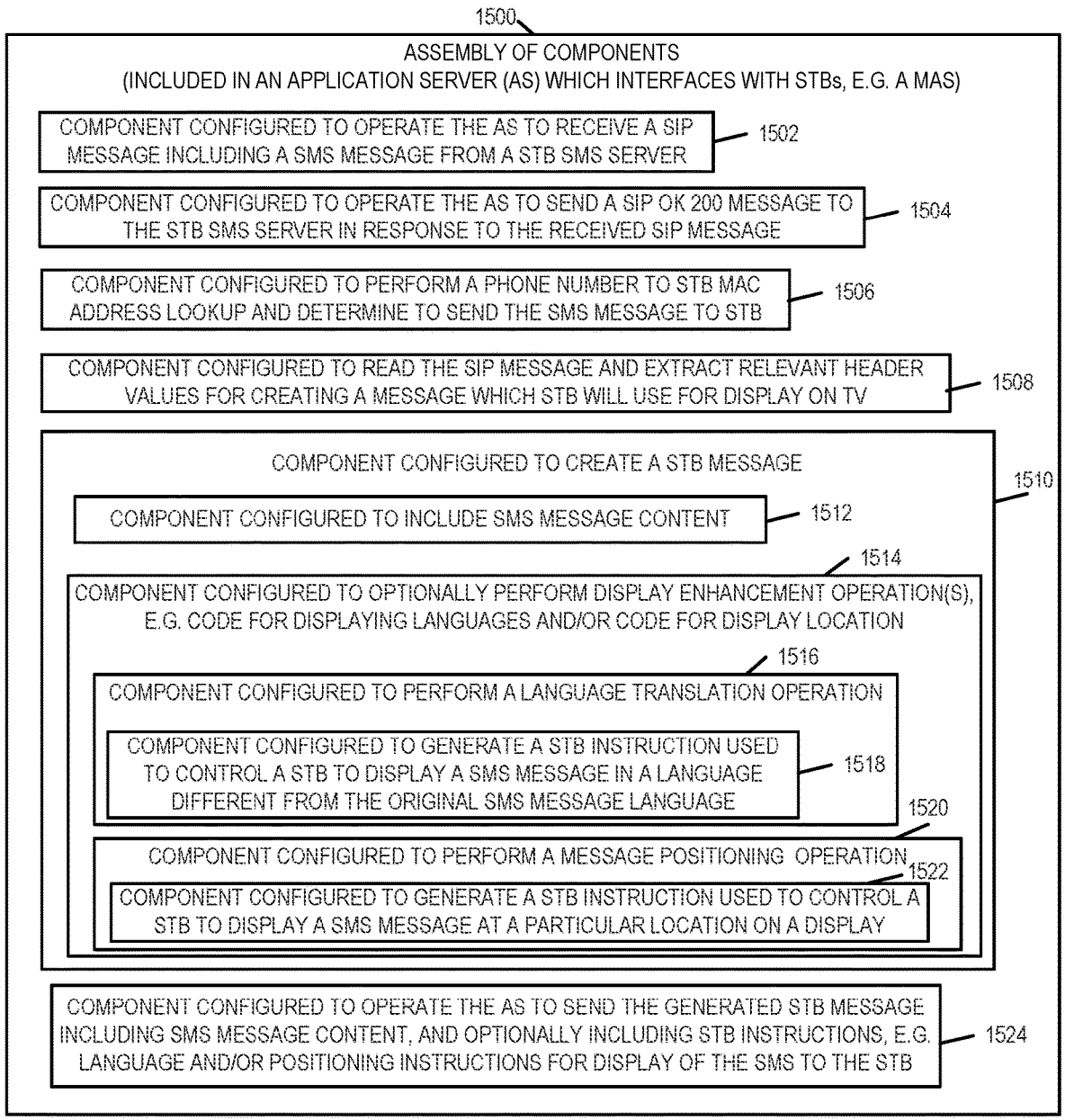
FIG. 15 is a drawing of an exemplary assembly of components which may be included in an application server which interfaces with STBs, e.g., a MAS, in accordance with an exemplary embodiment.

FIG. 15 is a drawing of an exemplary assembly of components 1500 which may be included in an application server (AS) which interfaces with STBs, e.g., a MAS, in accordance with an exemplary embodiment. Assembly of components 1500 is, e.g., included in any of MAS 1 124 of FIGS. 1 and 2, MAS m 125 of FIG. 1, and/or application server (AS) 800 of FIG. 8.

The components in the assembly of components 1500 can be, and in some embodiments are, implemented fully in hardware within a processor, e.g., processor 802, e.g., as individual circuits. The components in the assembly of components 1500 can be, and in some embodiments are, implemented fully in hardware within the assembly of hardware components 706, e.g., as individual circuits corresponding to the different components. In other embodiments some of the components are implemented, e.g., as circuits, within processor 802 with other components being implemented, e.g., as circuits within assembly of components 806, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 808 of the AS 800, with the components controlling operation of AS 800 to implement the functions corresponding to the components when the components are executed by a processor e.g., processor 802. In some such embodiments, the assembly of components 1500 is included in the memory 808 as part of an assembly of software components 820. In still other embodiments, various components in assembly of components 1500 are implemented as a combination of hardware and software, e.g., with another circuit external to the processor providing input to the processor which then under software control operates to perform a portion of a component's function.

When implemented in software the components include code, which when executed by a processor, e.g., processor 802, configure the processor to implement the function corresponding to the component. In embodiments where the assembly of components 1500 is stored in the memory 808, the memory 808 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the application server 800 or elements therein such as the processor 802, to perform the functions of corresponding steps illustrated in the signaling diagrams and/or described with respect to any of the Figures. Thus, the assembly of components 1500 includes various components that perform functions of corresponding one or more described and/or illustrated steps of an exemplary method, e.g., steps of the method of signaling diagram 200 of FIG. 2.

Assembly of components 1500 includes a component 1502 configured to operate the AS to receive a SIP message including a SMS message from a STB SMS server, a component 1504 configured to operate the AS to send a SIP 200 ok message to the STB SMS server in response to the received SIP message, a component 1506 configured to perform a phone number to STB MAC address lookup and determine to send the SMS message to the STB, and a component 1508 configured to read the received SIP message and extract relevant header value for creating a message which an STB will use for display on a TV.

Assembly of components 1500 further includes a component 1510 configured to create a STB message. Component 1510 includes a component 1512 configured to include SMS message content, and a component 1514 configured to optionally perform display enhancements operation(s), e.g., code for displaying languages, and/or code for display location. Component 1514 includes a component 1516 configured to perform a language translation operation, and a component 1520 configured to perform a message positioning operation. Component 1516 includes a component 1518 configured to generate a STB instruction used to control a STB to display a SMS message in a language different from the original SMS message language. Component 1520 includes a component 1522 configured to generate a STB instruction used to control a STB to display a SMS at a particular location on a display, e.g., top right hand corner or center bottom.

Assembly of components 1500 further includes a component 1524 configured to operate the AS to send the generated STB message including the SMS message content, and optionally including STB instructions, e.g., language and/or positioning instruction for display of the SMS message, to the STB.

Figure 16:
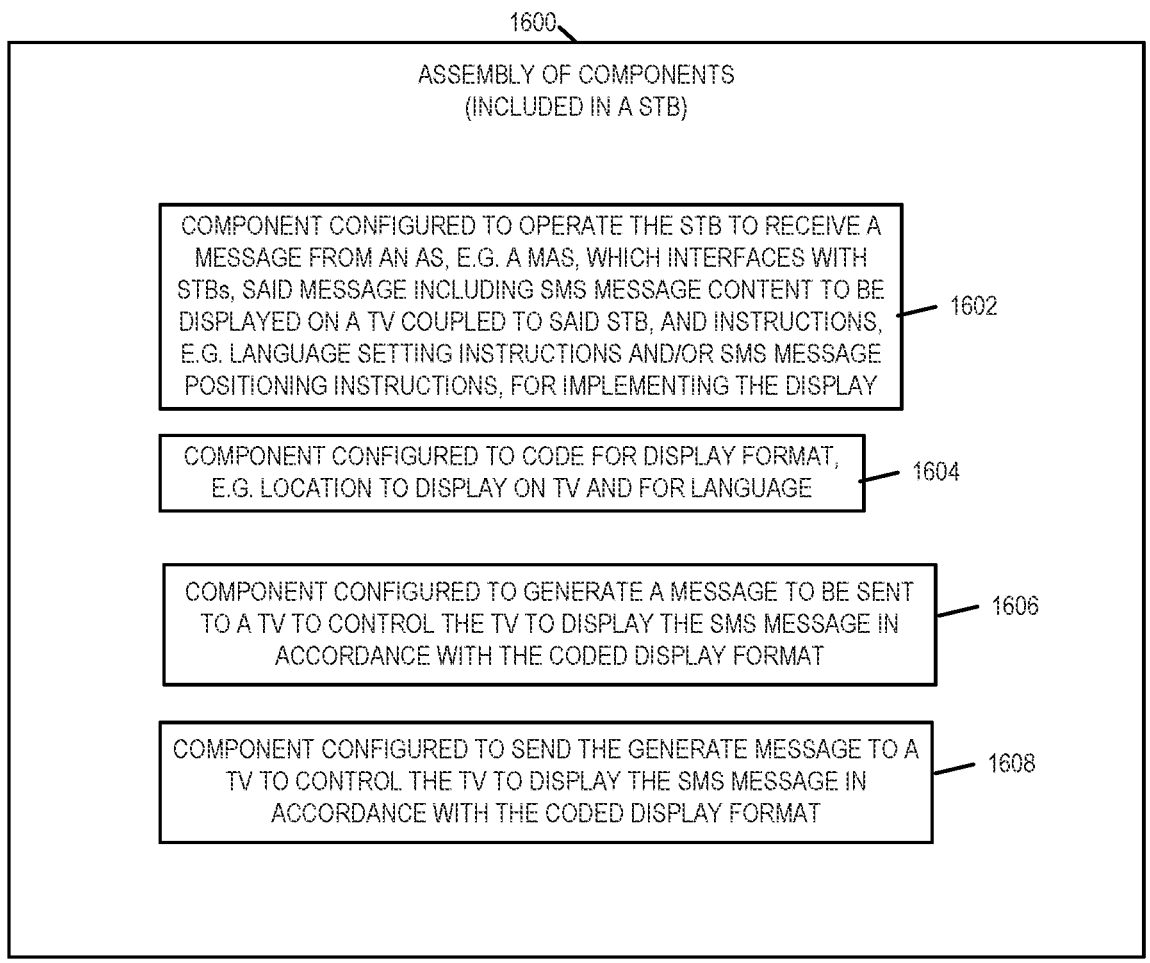
FIG. 16 is a drawing of an exemplary assembly of components which may be included in a STB in accordance with an exemplary embodiment.

FIG. 16 is a drawing of an exemplary assembly of components 1600 which may be included in a STB in accordance with an exemplary embodiment. Assembly of components 1600 is, e.g., included in any of STB 1 126 of FIGS. 1 and 2, STB n 127 of FIG. 1, STB 1A 131 of FIG. 1, STB nA 135 of FIG. 1 and/or STB 1000 of FIG. 10.

The components in the assembly of components 1600 can be, and in some embodiments are, implemented fully in hardware within a processor, e.g., processor 1002, e.g., as individual circuits. The components in the assembly of components 1600 can be, and in some embodiments are, implemented fully in hardware within the assembly of hardware components 1006, e.g., as individual circuits corresponding to the different components. In other embodiments some of the components are implemented, e.g., as circuits, within processor 1002 with other components being implemented, e.g., as circuits within assembly of components 1006, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1008 of the STB 1000, with the components controlling operation of STB 1000 to implement the functions corresponding to the components when the components are executed by a processor e.g., processor 1002. In some such embodiments, the assembly of components 1600 is included in the memory 1008 as part of an assembly of software components 1020. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1600 is stored in the memory 1008, the memory 1008 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the STB 1000 or elements therein such as the processor 1002, to perform the functions of corresponding steps illustrated in the signaling diagrams and/or described with respect to any of the Figures. Thus, the assembly of components 1600 includes various components that perform functions of corresponding one or more described and/or illustrated steps of an exemplary method, e.g., steps of the method of signaling diagram 200 of FIG. 2.

Assembly of components 1600 includes a component 1602 configured to operate the STB to receive a message from an AS, e.g. a MAS, which interfaces with STBs, said message including SMS message content to be displayed in a TV coupled to said STB, and instructions, e.g. language setting instructions and/or SMS message positioning instruction, for implementing on the display, a component 1604 configured to code for display format, e.g. location to display the SMS message on a TV display and for language, a component 1606 configured to generate a message to be sent to a TV coupled to STB to control the TV to display the SMS message in accordance with the coded display format, and a component 1608 configured to send the generated message to the TV coupled to the STB to control the TV to display the SMS message in accordance with coded display format, e.g. display the SMS message in the specified language at a specified location on the display screen of the TV, e.g. in the upper right hand corner of the TV display screen or centered across the bottom of the display screen of the TV.

Figure 17:
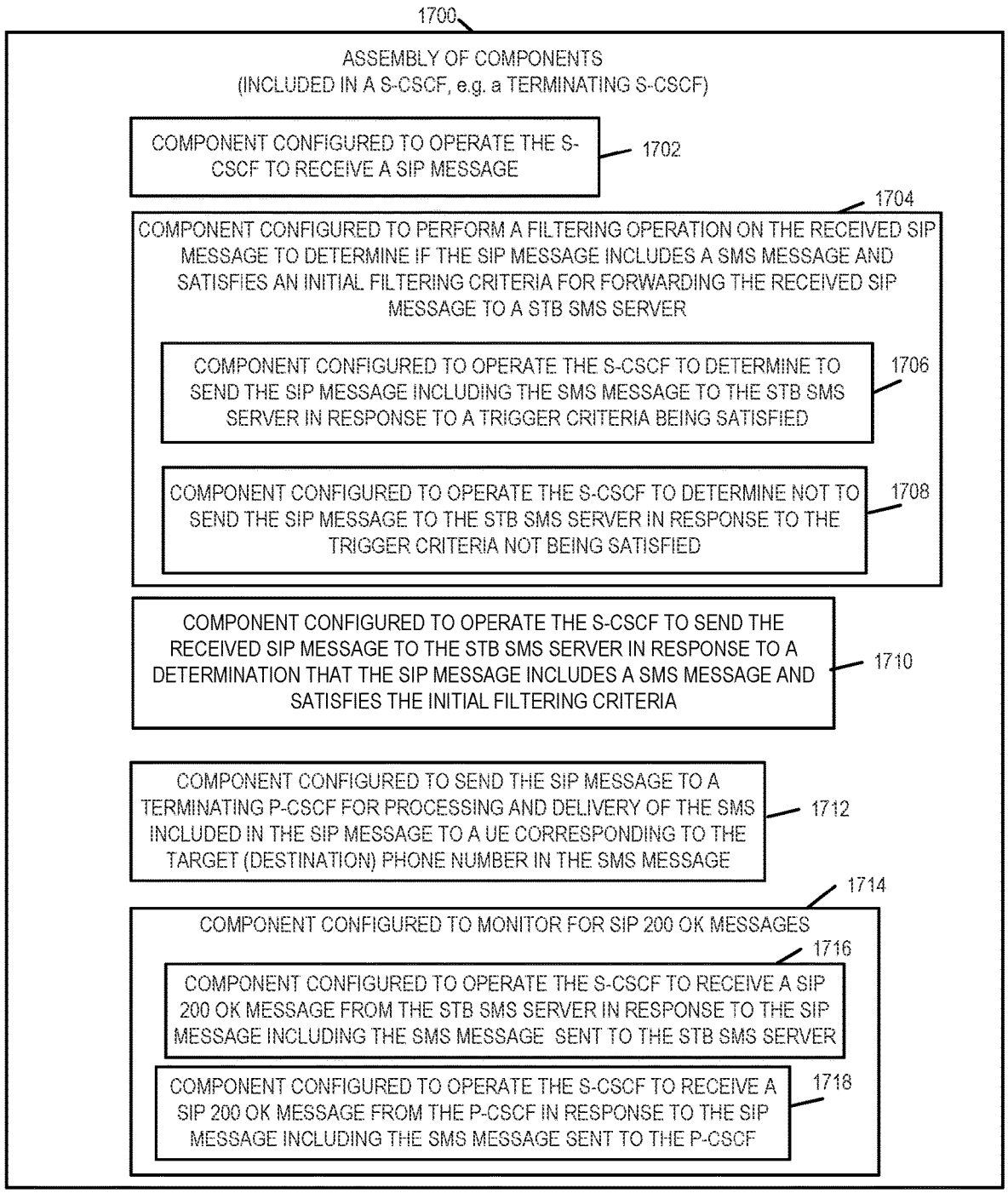
FIG. 17 is drawing of an exemplary assembly of components which may be included in a S-CSCF, e.g., a terminating S-CSCF, in accordance with an exemplary embodiment.

FIG. 17 is drawing of an exemplary assembly of components 1700 which may be included in a S-CSCF, e.g., a terminating S-CSCF, in accordance with an exemplary embodiment. Assembly of components 1700 is, e.g., included in S-CSCF 108 of FIGS. 1 and 2 and/or in S-CSCF 900 of FIG. 9.

The components in the assembly of components 1700 can be, and in some embodiments are, implemented fully in hardware within a processor, e.g., processor 902, e.g., as individual circuits. The components in the assembly of components 1700 can be, and in some embodiments are, implemented fully in hardware within the assembly of hardware components 906, e.g., as individual circuits corresponding to the different components. In other embodiments some of the components are implemented, e.g., as circuits, within processor 902 with other components being implemented, e.g., as circuits within assembly of components 906, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 908 of the STB 900, with the components controlling operation of STB 900 to implement the functions corresponding to the components when the components are executed by a processor e.g., processor 902. In some such embodiments, the assembly of components 1700 is included in the memory 908 as part of an assembly of software components 920. In still other embodiments, various components in assembly of components 1700 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1700 is stored in the memory 908, the memory 908 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the S-CSCF 900 or elements therein such as the processor 902, to perform the functions of corresponding steps illustrated in the signaling diagrams and/or described with respect to any of the Figures. Thus, the assembly of components 1700 includes various components that perform functions of corresponding one or more described and/or illustrated steps of an exemplary method, e.g., steps of the method of signaling diagram 200 of FIG. 2.

Assembly of components 1700 includes a component 1702 configured to operate the S-CSCF to receive a SIP message, e.g., a SIP message including a SMS message, and a component 1704 configured to perform a filtering operation on the received SIP message to determine if the SIP message includes an SMS message and satisfies an initial filtering criteria for forwarding the received SIP message to a STB SMS server. Component 1704 includes a component 1706 configured to operate the S-CSCF to determine to send the SIP message including the SMS message to the STB SMS server in response to a trigger criteria being satisfied, and a component 1708 configured to operate the S-CSCF to determine not to send the SMS message to the STB SMS server in response to the trigger criteria not being satisfied. Assembly of components 1700 further includes a component 1710 configured to operate the S-CSCF to send the received SIP message to STB SMS server in response to a determination that the SIP message includes a SMS message and satisfies the initial filtering criteria. In various embodiments, the S-CSCF performs an initial filtering operation, e.g., based on a specified trigger (see example of FIG. 3), and the STB SMS server subsequently performs a second filtering operation, e.g., based on the value of the a flag (e.g., SMS_DISPLAY_STB flag) in the STB subscriber profile associated with the target phone number.

Various features and/or aspects of some embodiments of the present invention are further described below. Methods and apparatus for communicating and displaying SMS messages are described. An SMS message is typically sent to the phone, corresponding to the target (destination) phone number associated with the SMS message. In some embodiments, in accordance with the present invention, an SMS message, e.g., included in a SIP message, is conditionally additionally directed toward a STB and is controlled to be displayed on a display device, e.g., a TV, coupled to the STB, in addition to be directed to the phone corresponding to the target phone number. Thus, a SMS message directed to a target phone number, associated with a customer premise in which a STB is located, can be, and sometimes is, also sent via a STB to be displayed on a TV coupled to the STB.

In some embodiments, a Home Subscriber Server (HSS) includes a new flag "SMS_DISPLAY_STB" in the IP Multimedia Subsystem subscriber profile. A new application server, e.g., a STB SMS server, for managing the incoming SMS is implemented. In some embodiments, the STB SMS server, is invoked using an initial filter criteria, e.g. an incoming SIP message including a SMS message is sent, e.g. forwarded, by a Serving-Call Session Control Function (S-CSCF) to the STB SMS server in response the initial filter criteria being satisfied.

In various embodiments, the new application server (STB SMS server) includes a mapping table for phone number to video endpoint mapping. This new application server (STB SMS server), in some embodiments, includes a diameter based interface (Sh) towards HSS. The new application server (STB SMS server) will read the received SIP: MESSAGE from S-CSCF and extract the called party phone number and do diameter Sh:User Data Repository (UDR) query to HSS and fetch the subscriber profile and will look to see if the "SMS_DISPLAY_STB" flag is enabled for the subscriber and if so, then it will do a lookup in its internal database for NPA-NXX mapping for finding correct vide endpoints and will send a SIP:MESSAGE (including the SMS message) to the video endpoint. The Video endpoint has a phone number to MAC address mapping in its database, which will be queried and used for routing the SMS to the correct STB/TV for display. In some embodiments, the video endpoint is an application server which interfaces with set top boxes, e.g., a Mystro Application Server (MAS). The application server, e.g. the MAS, is configured, in accordance with the present invention, to read SIP: MESSAGE (including the SMS message) and extract the relevant header values for creating a message which the STB will use for display on TV.

In some embodiments, NPA-NXX mapping data will be in the form or two tables, with one table for NPA to Region mapping (having two attributes namely "NPA prefix" & "Region Name") and the other table for Region to video endpoint mapping (having two attributes "Region name" & "Video Endpoint"). A service provider operator will provision these tables in the new application server (STB SMS server) as configuration data and will keep it updated. The video endpoint, in some embodiments, will be a Session Initiation Protocol (SIP) Uniform Resource Identifier (URI) and standard IP Multimedia Subsystem (IMS) Domain Name Service (DNS) lookup will be used to route the SIP:MESSAGE (including the SMS message) to it. The SIP:MESSAGE (including the SMS message) will be routed in a way that call completion is not on hold due to waiting for response from the video endpoint (e.g., the MAS).

An exemplary NPA to Region Mapping table is table 400 of FIG. 4. And exemplary Region to Video Endpoint Mapping table is table 450 of FIG. 4.

In various embodiments, standard SIP privacy header handling will be followed for this feature during routing and display of SMS via new application server (STB SMS server).

Numbered List of Exemplary Method Embodiments

Method Embodiment 1. A communications method comprising: receiving (222) at a Short Message Service (SMS) server (114) a Session Initiation Protocol (SIP) message including a target (e.g., called party) phone number and SMS content (e.g., in some embodiments the SIP message includes the SMS message which includes the target number (phone number of party to whom SMS message is directed) corresponding to the terminating UE to which the message is directed along with the text content being communicated in the SMS message); retrieving (240) (e.g., request step 242 and receive step 254 user profile information from Home Subscriber Server (HSS) 110) user profile information corresponding to the target phone number, said user profile information including set top box (STB) SMS display setting information; determining (255) from the retrieved user profile information if STB display of SMS messages is enabled for a STB associated with the target phone number; and taking an action (258) based on said determination, said action including: i) continuing operation without communicating the SIP message to another device for STB message delivery (e.g., SMS server drops the SIP message and continues operation, e.g., waiting to process other SIP messages) or ii) sending the SIP message to another device for STB message delivery in response to determining that the retrieved user profile information indicates that STB display of SMS messages is enabled.

Method Embodiment 1a. The method of Method Embodiment 1, wherein said SMS server is a STB SMS server.

Method Embodiment 1A. The method of Method Embodiment 1, further comprising, prior to the SMS server receiving (222) the SIP message: operating (212) a terminating Serving-Call Session Control Function (S-CSCF) (108) to receive said SIP message; performing (214), as the terminating S-CSCF, a filtering operation on the SIP message to determine that the SIP message includes a SMS message and satisfies an initial filtering criteria; operating (218) the terminating S-CSCF to send the SIP message to the SMS server in response to determining (216) that the SIP message includes an SMS message and satisfies the initial filtering criteria; and operating (224) the terminating S-CSCF to send the SIP message to a terminating Proxy-Call Session Control Function (P-CSCF) (130) for processing and delivery of the SMS message to a user equipment (UE) corresponding to the target (destination) phone number in the SMS message.

Method Embodiment 2. The communications method of Method Embodiment 1, wherein determining (255) from the retrieved user profile information if set top box (STB) display of SMS messages is enabled for a STB associated with the target phone number includes: checking (256) if an SMS display setting in the retrieved user profile is set to a first value (e.g., 1) used to indicate that SMS message display on a corresponding STB is enabled (e.g., check if SMS_DISPLAY_STB flag has a value=1 in user profile associated with target phone number in SMS message) (SMS_DISPLAY_STB flag is set to 1 to indicate SMS message on STB enabled or is set to 0 to indicate SMS message on STB is not enabled); and determining (257) from said check that set top box display of SMS is enabled.

Method Embodiment 2A. The communications method of Method Embodiment 1, wherein determining (255) from the retrieved user profile information if set top box (STB) display of SMS messages is enabled for a STB associated with the target phone number includes: checking (256) an SMS display setting in the retrieved user profile is set to a first value (e.g., 1) used to indicate that SMS message display on a corresponding STB is enabled (e.g., check if SMS_DISPLAY_STB flag has a value=1 in user profile associated with target phone number in SMS message) (SMS_DISPLAY_STB flag is set to 1 to indicate SMS message on STB enabled or to 0 to indicate SMS message on STB is not enabled); and determining (257') from said check that set top box display of SMS is not enabled.

Method Embodiment 3. The communications method of Method Embodiment 2, wherein taking an action (258) based on said determination includes sending the SIP message to another device for STB message delivery in response to determining that the retrieved user profile information indicates that STB display of SMS messages is enabled, said step of taking in action including: identifying (266) a video endpoint (e.g., application server 124 which supplies content for STB display in a picture in picture (PIP) window) to send the SMS message content to based on the target phone number included in the SMS message. (Note that in various embodiments a video endpoint application server interfaces to STBs in the region to which the video endpoint corresponds for STB messaging and display purposes. For example, a video endpoint in the form of an application server may, and sometimes does, interface with STBs in the region to which the application server corresponds, format message content for display and control a STB in the region to output the message for display on a display device, e.g., in a PIP window. The message which is displayed in some cases is an SMS message directed to a phone number associated with the STB and corresponding subscriber. The STB can be identified and/or addressed using a MAC address of the STB and/or an IP address assigned to the STB to which the SMS message is to be sent.)

Method Embodiment 4. The method of Method Embodiment 3, wherein identifying (266) a video endpoint (e.g., application server 124 which supplies content for STB display in a picture in picture window) to send the SMS message content to based on the target phone number included in the SMS message includes: determining (268) a region (e.g., geographic service region) from a first portion of the target phone number (NPA, e.g., 3 number area code portion) in which the set top box to which the SMS message is to be sent is located from a first phone number portion to region mapping table; and identifying (270) a video endpoint (e.g. obtain a video endpoint identifier, IP address and port number) from the determined region and a second mapping table, said second mapping table mapping different regions to different video endpoints.

Method Embodiment 5. The method of Method Embodiment 3, wherein the identified video endpoint is an application server (124) which interfaces with STBs; and wherein the method further comprises: operating (285) the application server (124) to perform a phone number to STB MAC or IP address lookup to determine an address to be used to send the SMS message to the STB corresponding to the target phone number included in the SMS message.

Method Embodiment 5A. The method of Method Embodiment 5, wherein said application server (124) is a Mystro Application Server (MAS).

Method Embodiment 6. The method of Method Embodiment 5, further comprising: operating (286) the application sever to extract message text from the SIP message; and operating (288) the application server to create the STB message including STB message content, said STB message content including SMS message information to be displayed in a picture in picture window from the extracted message text, said STB message content including an indication that an SMS message was received and indicating the text message that was included in the SMS message (and optionally indicating the sender phone number); and sending (289) the STB message to the STB to trigger the STB to output (293) SMS information to a display for display in a PIP window on a display device (128).

Method Embodiment 7. The method of Method Embodiment 6, wherein creating (287) the STB message includes: performing a language translation operation (289), said language translation operation including generating (290) a STB instruction used to control a STB to display SMS message content in a language (e.g., second language) different from the original SMS message content language (e.g., a first language).

Method Embodiment 8. The method of Method Embodiment 6, further comprising: sending (278) a SIP ok message (280) from the application server (video endpoint) (124) to the SMS server (114) in response to the SIP message (274), said SIP ok message indicating successful processing associated with the SIP message (274) which was received by the application server (video end point device) (124) from the SMS server (114); and operating (282) the SMS server (114) to send a SIP ok message (283) to the S-CSCF (108) in response to receiving the SIP ok message (280) from the application server (video end point device) (124).

Numbered List of Exemplary System Embodiments

System Embodiment 1. A communications system (100) comprising: a Short Message Service (SMS) server (STB SMS server 114 or 700) including: a first receiver (712); a first transmitter (714); and a first processor (702) configured to: operate (222) the SMS server (114) to receive a Session Initiation Protocol (SIP) message including a target (e.g., called party) phone number and SMS content (e.g., in some embodiments the SIP message includes the SMS message which includes the target number (phone number of party to whom SMS message is directed) corresponding to the terminating UE to which the message is directed along with the text content being communicated in the SMS message); operate (240) the SMS server (114) to retrieve (e.g., request step 242 and receive step 254 user profile information from Home Subscriber Server (HSS) 110) user profile information corresponding to the target phone number, said user profile information including set top box (STB) SMS display setting information; determine (255) from the retrieved user profile information if STB display of SMS messages is enabled for a STB associated with the target phone number; and operate the SMS server (114) to take an action (258) based on said determination, said action including: i) continuing operation without communicating the SIP message to another device for STB message delivery (e.g., SMS server drops SIP message and continues operation, e.g., waiting to process other SIP messages) or ii) sending the SIP message to another device for STB message delivery in response to determining that the retrieved user profile information indicates that STB display of SMS messages is enabled.

System Embodiment 1a. The communications system (100) of System Embodiment 1, wherein said SMS server (114 or 700) is a Set Top Box (STB) SMS server.

System Embodiment 1A. The communications system (100) of System Embodiment 1, wherein said system (100) further comprises a terminating Serving-Call Session Control Function (S-CSCF) (108 or 900) including: a second receiver (912); a second transmitter (914); and a second processor (902); and wherein said second processor (902) is configured to, prior to the SMS server receiving (222) the SIP message: operate (212) the terminating Serving-Call Session Control Function (S-CSCF) (108) to receive said SIP message; perform (214), at the terminating S-CSCF, a filtering operation on the SIP message to determine that the SIP message includes a SMS message and satisfies an initial filtering criteria; operate (218) the terminating S-CSCF to send the SIP message to the SMS server in response to determining (216) that the SIP message includes an SMS message and satisfies the initial filtering criteria; and operate (224) the terminating S-CSCF to send the SIP message to a terminating Proxy-Call Session Control Function (P-CSCF) (130) for processing and delivery of the SMS message to a user equipment (UE) corresponding to the target (destination) phone number in the SMS message.

System Embodiment 2. The communications system (100) of System Embodiment 1, wherein said first processor (702) is configured to: check (256) if an SMS display setting in the retrieved user profile is set to a first value (e.g., 1) used to indicate that SMS message display on a corresponding STB is enabled (e.g., check if SMS_display_STB flag has a value=1 in user profile associated with target phone number in SMS message) (SMS_display_STB flag is set to 1 to indicate SMS message on STB enabled or to 0 to indicate SMS message on STB is not enabled); and determine (257) from said check that set top box display of SMS is enabled, as part of being configured to determine (255) from the retrieved user profile information if set top box (STB) display of SMS messages is enabled for a STB associated with the target phone number.

System Embodiment 2A. The communications system (100) of System Embodiment 1, wherein said first processor is configured to: check (256) if an SMS display setting in the retrieved user profile is set to a first value (e.g., 1) used to indicate that SMS message display on a corresponding STB is enabled (e.g., check if SMS_DISPLAY_STB flag has a value=1 in user profile associated with target phone number in SMS message) (SMS_DISPLAY_STB flag is set to 1 to indicate SMS message on STB enabled or to 0 to indicate SMS message on STB is not enabled); and determine (257') from said check that set top box display of SMS is not enabled, as part of being configured to determine (255) from the retrieved user profile information if set top box (STB) display of SMS messages is enabled for a STB associated with the target phone number.

System Embodiment 3. The communications system (100) of System Embodiment 2, wherein said first processor (702) is configured to: identify (266) a video endpoint (e.g., application server 124 which supplies content for STB display in a picture in picture (PIP) window) to send the SMS message content to based on the target phone number included in the SMS message, as part of being configured to take an action (258) based on said determination including sending the SIP message to another device for STB message delivery in response to determining that the retrieved user profile information indicates that STB display of SMS messages is enabled. (Note that in various embodiments a video endpoint application server interfaces to STBs in the region to which the video end point corresponds for STB messaging and display purposes. For example, a video endpoint in the form of an application server may, and sometimes does, interface with STBs in the region to which the application server corresponds, format message content for display and control a STB in the region to output the message for display on a display device, e.g., in a PIP window. The message which is displayed in some cases is an SMS message directed to a phone number associated with the STB and corresponding subscriber. The STB can be identified and/or addressed using a MAC address of the STB and/or an IP address assigned to the STB to which the SMS message is to be sent.)

System Embodiment 4. The communications system (100) of System Embodiment 3, wherein said first processor (702) is configured to: determine (268) a region (e.g., geographic service region) from a first portion of the target phone number (NPA, e.g., 3 number area code portion) in which the set top box to which the SMS message is to be sent is located from a first phone number portion to region mapping table; and identify (270) a video endpoint (e.g. obtain a video endpoint identifier, IP address and port number) from the determined region and a second mapping table, said second mapping table mapping different regions to different video endpoints, as part of being configured to identify (266) a video endpoint (e.g., application server 124 which supplies content for STB display in a picture in picture window) to send the SMS message content to based on the target phone number included in the SMS message.

System Embodiment 5. The communications system (100) of System Embodiment 3, further comprising: an application server (124 or 800) with interfaces with STBs, said application server (124) including a second processor (802); wherein the identified video endpoint is said application server (124) which interfaces with STBs (126, 127); and wherein the second processor (802) is configured to operate (285) the application server (124) to perform a phone number to STB MAC or IP address lookup to determine an address to be used to send the SMS message to the STB (126) corresponding to the target phone number included in the SMS message.

System Embodiment 5A. The communications system (100) of System Embodiment 5, wherein said application server (124) is a Mystro Application Server (MAS).

System Embodiment 6. The communications system (100) of System Embodiment 5, wherein said application server (124) includes a second transmitter (814); and wherein said second processor (802) is configured to: operate (286) the application server (124) to extract message text from the SIP message; operate (288) the application server (124) to create the STB message including STB message content, said STB message content including SMS message information to be displayed in a picture in picture window from the extracted message text, said STB message content including an indication that an SMS message was received and indicating the text message that was included in the SMS message (and optionally indicating the sender phone number); and operate the application server (124) to send (289) (via transmitter 814) the STB message to the STB (126) to trigger the STB (126) to output (293) SMS information to a display for display in a PIP window on a display device (TV 1 128).

System Embodiment 7. The communications system (100) of System Embodiment 6, wherein said second processor (802) is configured to: performing a language translation operation (289) as part of being configured to create (287) the STB message, said language translation operation including generating (290) a STB instruction used to control a STB to display SMS message content in a language (e.g., second language) different from the original SMS message content language (e.g., a first language).

System Embodiment 8. The communications system (100) of System Embodiment 6, wherein said second processor (802) is configured to operate the application server (124) to: send (278) (e.g. via transmitter 814) a SIP ok message (280) from the application server (124) to the SMS server (114) in response to the SIP message (274), said SIP ok message (280) to the SMS server (114) indicating successful processing associated with the SIP message (274) which was received by the application server (video end point) (124) from the SMS server (114); and wherein said first processor (702) is configured to: operate (282) the SMS server (114) to send a SIP ok message (283) to the S-CSCF (108) in response to receiving the SIP ok message (280) from the application server (video end point device) (124).

Numbered List of Non-Transitory Computer Readable Medium Embodiments

Non-Transitory Computer Readable Medium Embodiment 1. A non-transitory computer readable medium (708) including machine executable instructions which when executed by a processor (702) of a Short Message Service (SMS) server (114 or 700), cause the SMS server (114 or 700) to perform the steps of: receiving (222) at the SMS server (114) a Session Initiation Protocol (SIP) message including a target (e.g., called party) phone number and SMS content (e.g., in some embodiments the SIP message includes the SMS message which includes the target number (phone number of party to whom SMS message is directed) corresponding to the terminating UE to which the message is directed along with the text content being communicated in the SMS message); retrieving (240) (e.g., request step 242 and receive step 254 user profile information from Home Subscriber Server (HSS) 110) user profile information corresponding to the target phone number, said user profile information including set top box (STB) SMS display setting information; determining (255) from the retrieved user profile information if STB display of SMS messages is enabled for a STB associated with the target phone number; and taking an action (258) based on said determination, said action including: i) continuing operation without communicating the SIP message to another device for STB message delivery (e.g., SMS server drops the SIP message and continues operation, e.g., waiting to process other SIP messages) or ii) sending the SIP message to another device for STB message delivery in response to determining that the retrieved user profile information indicates that STB display of SMS messages is enabled.

Various embodiments are directed to apparatus, e.g., a SMS server such as a STB SMS server, an application server which interfaces with STBs, a S-CSCF device, a P-CSCF device, a STB, a TV, a IPSMGW, a HSS, master nodes, e.g., master node base stations, secondary nodes, e.g. secondary node base stations, user equipments (UEs), e.g. UEs supporting dual connectivity, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating e.g., a SMS server such as a STB SMS server, an application server which interfaces with STBs, a S-CSCF device, a P-CSCF device, a STB, a TV, a IPSMGW, a HSS, a master node, e.g., a master node base station, a secondary node, e.g. secondary node base station, a user equipment (UE), e.g. a UE supporting dual connectivity, a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a SMS server such as a STB SMS server, an application server which interfaces with STBs, a S-CSCF device, a P-CSCF device, a STB, a TV, a IPSMGW, a HSS, a master node, e.g., a master node base station, a secondary node, e.g. a secondary node base station, a user equipment (UE), e.g. a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a SMS server such as a STB SMS server, an application server which interfaces with STBs, a S-CSCF device, a P-CSCF device, a STB, a TV, a IPSMGW, a HSS, a master node, e.g., a master node base station, a secondary node, e.g. a secondary node base station, a user equipment (UEs), e.g. a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a SMS server such as a STB SMS server, an application server which interfaces with STBs, a S-CSCF device, a P-CSCF device, a STB, a TV, a IPSMGW, a HSS, a master node, e.g., a master node base station, a secondary node, e.g. a secondary node base station, a user equipment (UE), e.g. a UE supporting dual connectivity, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a SMS server such as a STB SMS server, an application server which interfaces with STBs, a S-CSCF device, a P-CSCF device, a STB, a TV, a IPSMGW, a HSS, a communications node such as a master node, e.g., a master node base station, a secondary node, e.g. a secondary node base station, a user equipment (UE), e.g. a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a SMS server such as a STB SMS server, an application server which interfaces with STBs, a S-CSCF device, a P-CSCF device, a STB, a TV, a IPSMGW, a HSS, a master node, e.g., a master node base station, a secondary node, e.g. a secondary node base station, a user equipment (UE), e.g. a UEs supporting dual connectivity, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
receiving at a Short Message Service (SMS) server a Session Initiation Protocol (SIP) message including a target phone number and SMS content;
retrieving user profile information corresponding to the target phone number, said user profile information including set top box (STB) SMS display setting information;
determining from the retrieved user profile information if STB display of SMS messages is enabled for a STB associated with the target phone number; and
taking an action based on said determination, said action including: i) continuing operation without communicating the SIP message to another device for STB message delivery or ii) sending the SIP message to another device for STB message delivery in response to determining that the retrieved user profile information indicates that STB display of SMS messages is enabled.

2. The method of claim 1, further comprising, prior to the SMS server receiving the SIP message:
operating a terminating Serving-Call Session Control Function (S-CSCF) to receive said SIP message;
performing, at the terminating S-CSCF, a filtering operation on the SIP message to determine that the SIP message includes a SMS message and satisfies an initial filtering criteria;
operating the terminating S-CSCF to send the SIP message to the SMS server in response to determining that the SIP message includes an SMS message and satisfies the initial filtering criteria; and
operating the terminating S-CSCF to send the SIP message to a terminating Proxy-Call Session Control Function (P-CSCF) for processing and delivery of the SMS message to a user equipment (UE) corresponding to the target phone number in the SMS message.

3. The communications method of claim 1,
wherein determining from the retrieved user profile information if set top box (STB) display of SMS messages is enabled for a STB associated with the target phone number includes:
checking if an SMS display setting in the retrieved user profile is set to a first value used to indicate that SMS message display on a corresponding STB is enabled; and
determining from said check that set top box display of SMS is enabled.

4. The communications method of claim 1,
wherein determining from the retrieved user profile information if set top box (STB) display of SMS messages is enabled for a STB associated with the target phone number includes:
checking if an SMS display setting in the retrieved user profile is set to a first value used to indicate that SMS message display on a corresponding STB is enabled; and
determining from said check that set top box display of SMS is not enabled.

5. The communications method of claim 3, wherein taking an action based on said determination includes sending the SIP message to another device for STB message delivery in response to determining that the retrieved user profile information indicates that STB display of SMS messages is enabled, said step of taking in action including:
identifying a video endpoint to send the SMS message content to based on the target phone number included in the SMS message.

6. The method of claim 5, wherein identifying a video endpoint to send the SMS message content to based on the target phone number included in the SMS message includes:
determining a region from a first portion of the target phone number in which the set top box to which the SMS message is to be sent is located from a first phone number portion to region mapping table; and
identifying a video endpoint from the determined region and a second mapping table, said second mapping table mapping different regions to different video endpoints.

7. The method of claim 5,
wherein the identified video endpoint is an application server which interfaces with STBs; and
wherein the method further comprises:
operating the application server to perform a phone number to STB MAC or IP address lookup to determine an address to be used to send the SMS message to the STB corresponding to the target phone number included in the SMS message.

8. The method of claim 7, further comprising:
operating the application server to extract message text from the SIP message; and
operating the application server to create the STB message including STB message content, said STB message content including SMS message information to be displayed in a picture in picture (PIP) window from the extracted message text, said STB message content including an indication that an SMS message was received and indicating the text message that was included in the SMS message; and sending the STB message to the STB to trigger the STB to output SMS information to a display for display in a PIP window on a display device.

9. The method of claim 8, wherein creating the STB message includes:
performing a language translation operation, said language translation operation including generating a STB instruction used to control a STB to display SMS message content in a language different from the original SMS message content language.

10. The method of claim 8, further comprising:
sending a SIP ok message from the application server to the SMS server in response to the SIP message, said SIP ok message indicating successful processing associated with the SIP message which was received by the application server from the SMS server; and
operating the SMS server to send a SIP ok message to a Serving-Call Session Control Function (S-CSCF) in response to receiving the SIP ok message from the application server.

11. A communications system comprising:
a Short Message Service (SMS) server including:
a first receiver;
a first transmitter; and a first processor configured to:
operate the SMS server to receive a Session Initiation Protocol (SIP) message including a target phone number and SMS content;
operate the SMS server to retrieve user profile information corresponding to the target phone number, said user profile information including set top box (STB) SMS display setting information;
determine from the retrieved user profile information if STB display of SMS messages is enabled for a STB associated with the target phone number; and
operate the SMS server to take an action based on said determination, said action including: i) continuing operation without communicating the SIP message to another device for STB message delivery or ii) sending the SIP message to another device for STB message delivery in response to determining that the retrieved user profile information indicates that STB display of SMS messages is enabled.

12. The communications system of claim 11, wherein said system further comprises a terminating Serving-Call Session Control Function (S-CSCF) including:
a second receiver;
a second transmitter;
a second processor; and
wherein said second processor is configured to, prior to the SMS server receiving the SIP message:
operate the terminating S-CSCF to receive said SIP message;
perform, at the terminating S-CSCF, a filtering operation on the SIP message to determine that the SIP message includes a SMS message and satisfies an initial filtering criteria;
operate the terminating S-CSCF to send the SIP message to the SMS server in response to determining that the SIP message includes an SMS message and satisfies the initial filtering criteria; and
operate the terminating S-CSCF to send the SIP message to a terminating Proxy-Call Session Control Function (P-CSCF) for processing and delivery of the SMS message to a user equipment (UE) corresponding to the target phone number in the SMS message.

13. The communications system of claim 11, wherein said first processor is configured to:
check if an SMS display setting in the retrieved user profile is set to a first value used to indicate that SMS message display on a corresponding STB is enabled; and
determine from said check that set top box display of SMS is enabled,
as part of being configured to determine from the retrieved user profile information if set top box (STB) display of SMS messages is enabled for a STB associated with the target phone number.

14. The communications system of claim 13, wherein said first processor is configured to:
identify a video endpoint to send the SMS message content to based on the target phone number included in the SMS message, as part of being configured to take an action based on said determination including sending the SIP message to another device for STB message delivery in response to determining that the retrieved user profile information indicates that STB display of SMS messages is enabled.

15. The communications system of claim 14, wherein said first processor is configured to:
determine a region from a first portion of the target phone number in which the set top box to which the SMS message is to be sent is located from a first phone number portion to region mapping table; and
identify a video endpoint from the determined region and a second mapping table, said second mapping table mapping different regions to different video endpoints,
as part of being configured to identify a video endpoint to send the SMS message content to based on the target phone number included in the SMS message.

16. The communications system of claim 14, further comprising:
an application server with interfaces with STBs, said application server including a second processor;
wherein the identified video endpoint is said application server which interfaces with STBs; and
wherein the second processor is configured to operate the application server to perform a phone number to STB MAC or IP address lookup to determine an address to be used to send the SMS message to the STB corresponding to the target phone number included in the SMS message.

17. The communications system of claim 16, wherein said application server includes a second transmitter; and
wherein said second processor is configured to:
operate the application sever to extract message text from the SIP message; and
operate the application server to create the STB message including STB message content, said STB message content including SMS message information to be displayed in a picture in picture (PIP) window from the extracted message text, said STB message content including an indication that an SMS message was received and indicating the text message that was included in the SMS message; and
operate the application server to send the STB message to the STB to trigger the STB to output SMS information to a display for display in a PIP window on a display device.

18. The communications system of claim 17, wherein said second processor is configured to:
perform a language translation operation as part of being configured to create the STB message, said language translation operation including generating a STB instruction used to control a STB to display SMS message content in a language different from an original SMS message content language.

19. The communications system of claim 17,
wherein said second processor is configured to operate the application server to:
send a SIP ok message from the application server to the SMS server in response to the SIP message, said SIP ok message to the SMS server indicating successful processing associated with the SIP message which was received by the application server from the SMS server; and
wherein said first processor is configured to: operate the SMS server to send a SIP ok message to a Serving-Call Session Control Function (S-CSCF) in response to receiving the SIP ok message from the application server.

20. A non-transitory computer readable medium including machine executable instructions which when executed by a processor of a Short Message Service (SMS) server, cause the SMS server to perform the steps of:

receiving at the SMS server a Session Initiation Protocol (SIP) message including a target phone number and SMS content;

retrieving user profile information corresponding to the target phone number, said user profile information including set top box (STB) SMS display setting information;

determining from the retrieved user profile information if STB display of SMS messages is enabled for a STB associated with the target phone number; and taking an action based on said determination, said action including: i) continuing operation without communicating the SIP message to another device for STB message delivery or ii) sending the SIP message to another device for STB message delivery in response to determining that the retrieved user profile information indicates that STB display of SMS messages is enabled.

* * * * *